(12) United States Patent
Naito et al.

(10) Patent No.: US 7,533,079 B2
(45) Date of Patent: May 12, 2009

(54) DEVICE AND METHOD FOR PROCESSING SITUATED INFORMATION

(75) Inventors: Hirohisa Naito, Kawasaki (JP); Kuniharu Takayama, Kawasaki (JP); Yoshiharu Maeda, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 430 days.

(21) Appl. No.: 11/060,551

(22) Filed: Feb. 18, 2005

(65) Prior Publication Data
US 2005/0164725 A1    Jul. 28, 2005

Related U.S. Application Data

(63) Continuation of application No. PCT/JP02/08579, filed on Aug. 26, 2002.

(51) Int. Cl.
G06F 17/30    (2006.01)

(52) U.S. Cl. .......................... 707/2; 707/100

(58) Field of Classification Search ............... 707/100, 707/104.1, 2, 102
See application file for complete search history.

(56) References Cited

U.S. PATENT DOCUMENTS

| | | | | |
|---|---|---|---|---|
| 6,330,589 B1* | 12/2001 | Kennedy | ..................... | 709/206 |
| 6,381,534 B2* | 4/2002 | Takayama et al. | ........... | 701/201 |
| 6,925,603 B1* | 8/2005 | Naito et al. | .................. | 715/733 |
| 7,035,848 B2* | 4/2006 | Shapiro et al. | .................. | 707/5 |
| 7,139,746 B2* | 11/2006 | Shin et al. | ....................... | 707/2 |
| 7,266,376 B2* | 9/2007 | Nakagawa | ............... | 455/456.1 |
| 2002/0020211 A1* | 2/2002 | Lambertz et al. | .............. | 73/116 |

FOREIGN PATENT DOCUMENTS

| | | |
|---|---|---|
| JP | 2-196393 | 8/1990 |
| JP | 9-171504 | 6/1997 |
| JP | 11-65434 | 3/1999 |
| JP | 2000/215211 | 8/2000 |
| JP | 2001-92878 | 4/2001 |
| JP | 2001-165766 | 6/2001 |
| JP | 2001-306590 | 11/2001 |
| JP | 2002-140602 | 5/2002 |
| WO | WO99/40524 | 8/1999 |

OTHER PUBLICATIONS

N. Marmasse, et al., "Location-aware information delivered with commotion", Proceedings of International Symposium on Handheld and Ubiquitous Computing (HUC 2000), 2000.

A.K. Dey, et al., "CybreMinder: A Context-Aware System for Supporting Reminders", Proceedings of International Symposium on Handheld and Ubiquitous Computing (HUC 2000), 2000.

(Continued)

*Primary Examiner*—Cheryl Lewis
(74) *Attorney, Agent, or Firm*—Fujitsu Patent Center

(57) ABSTRACT

Situated information (SI) is created by adding situation information, which expresses by 5W1H a situation where an information resource becomes effective, to the information resource, and the SI is registered to an SI memory unit. Then, information resource which has situation information fitting the current situation is selected and presented to a user.

12 Claims, 27 Drawing Sheets

OTHER PUBLICATIONS

G. W. Fitzmaurice, "Situated Information Spaces and Spatially Aware Palmtop Computers", Communications of the ACM, vol. 36, No. 7, pp. 38-49, Jul. 1993.

T. Höllerer, et al., "Exploring MARS: developing indoor and outdoor user interfaces to a mobile augmented reality system", Computer & Graphics, vol. 23, No. 6, Elsevier Publishers, pp. 779-785, 1999.

S. Long, et al., "Rapid Prototyping of Mobile Context-Aware Applications: The Cyperguide Case Study", Proceedings of the 2nd ACM International Conference on Mobile Computing and Networking, (MobiCom '96), ACM Press, New York, 1996.

S. Pradhan, et al., "Websigns: Hyperlinking Physical Locations to the Web", Computer, pp. 42-48, Aug. 2001.

A. K. Dey, et al., "A Conceptual Framework and a Toolkit for Supporting the Rapid Prototyping of Context-Aware Applications", Human Computer Interaction, 2001, vol. 16, pp. 1-67, Jul. 1993, <URGL http://www1.ics.uci.edu/~jpd/NonTradUI/SpecialIssue/anchor.pdf>.

"vCalendar: The Electronic Calendaring and Scheduling Exchange Format Version 1.0", A versit Consortium Specification, Sep. 18, 1996.

R. W. Picard, Affective Computing MIT Press, Cambridge, 1997.

W. Ark, et al., "The Emotion Mouse", Proceedings of the HCI International 99 Conference, Munich, Germany, Aug. 24-26, 1999.

P. Maes, et al., "Learning Interface Agents", Proceedings of the Eleventh National Conference on Artificial Intelligence '93, Washington, DC, pp. 459-465, MIT Press, Jul. 1993.

H. Naito, et al., "Situated Information", Proceedings of the International Workshop on AI in mobile Systems (AIMS2001), IJCAI 2001, pp. 1-6.

H. Naito, et al., "Design Principle for Effective Information Providing", AAAI-02 Workshop on Intelligent Service Integration, Jul. 2002.

NaVigation Markup Language (NVML), Work Wide Web Consortium (W3C) Note. Aug. 6, 1999, <URL: http://www.w3.org/TR/1999/NOTE-NVML-19990806>.

Tarumi, et al., Space Tag's Application and their Social Impact, Information Processing Society of Japan, 99-GW-33, vol. 99, No. 88, pp. 31-36, Oct. 22, 1999.

Suzuki, et al., "Searching of Media-Objects Using Their Event History", Information Processing Society of Japan, 96-IM-28, vol. 96, No. 119, pp. 67-72, Nov. 29, 1996.

Tarumi, et al., Space "Tag System Prototype for Mobile Phone Terminals", IPSJ Symposium Series, vol. 2001, No. 7, pp. 495-500, Jun. 27, 2001.

Kono, Special Topic—Information Acquisition Supporting Artificial Intelligence Society, No. 16, No. 4, Jul. 2001, pp. 494-534, Jul. 2001.

Steven Finer et al., "Knowledge-based augmented reality", communications of the ACM, vol. 36, No. 7, pp. 52-62, Jul. 1993.

Jun Rekimoto, et al., "The world through the Computer: Computer Augmented Interaction with Real World Environments", Proceedings of the ACM Symposium on User Interface Software and Technology (UIST '95), pp. 29-36, Nov. 14, 1995.

Kono, Special Topic—Information Acquisition Supporting Artificial Technology of Web Systems Intelligence Society, No. 16, No. 4, Jul. 2001, pp. 494-534, Jul. 2001.

Japanese Patent Office Action, mailed Dec. 18, 2007 and issued in corresponding Japanese Patent Application No. 2004-530511.

Office Action mailed Mar. 11, 2008 and issued in corresponding Japanese Patent Application No. 2004-530511.

Office Action mailed on May 20, 2008 and issued in corresponding Japanese Patent Application No. 2004-530511.

* cited by examiner

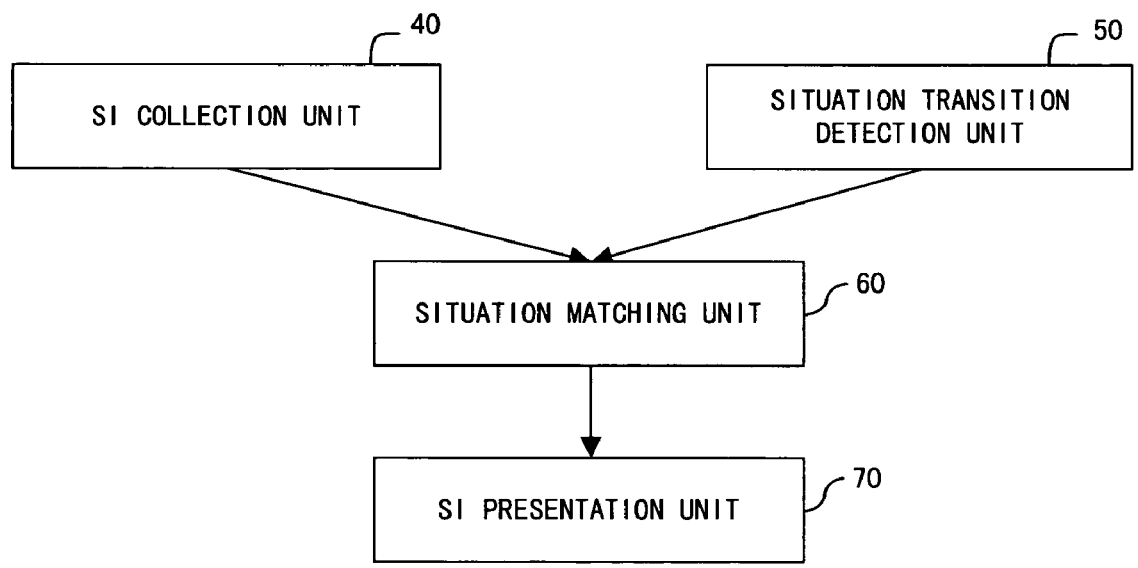
F I G. 9

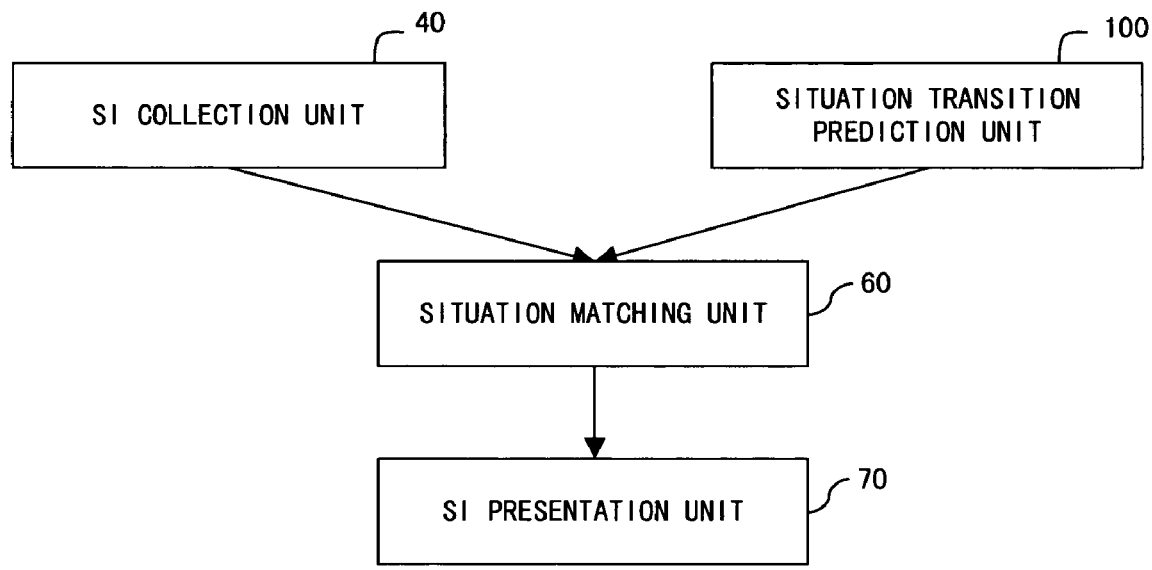
F I G. 1 0

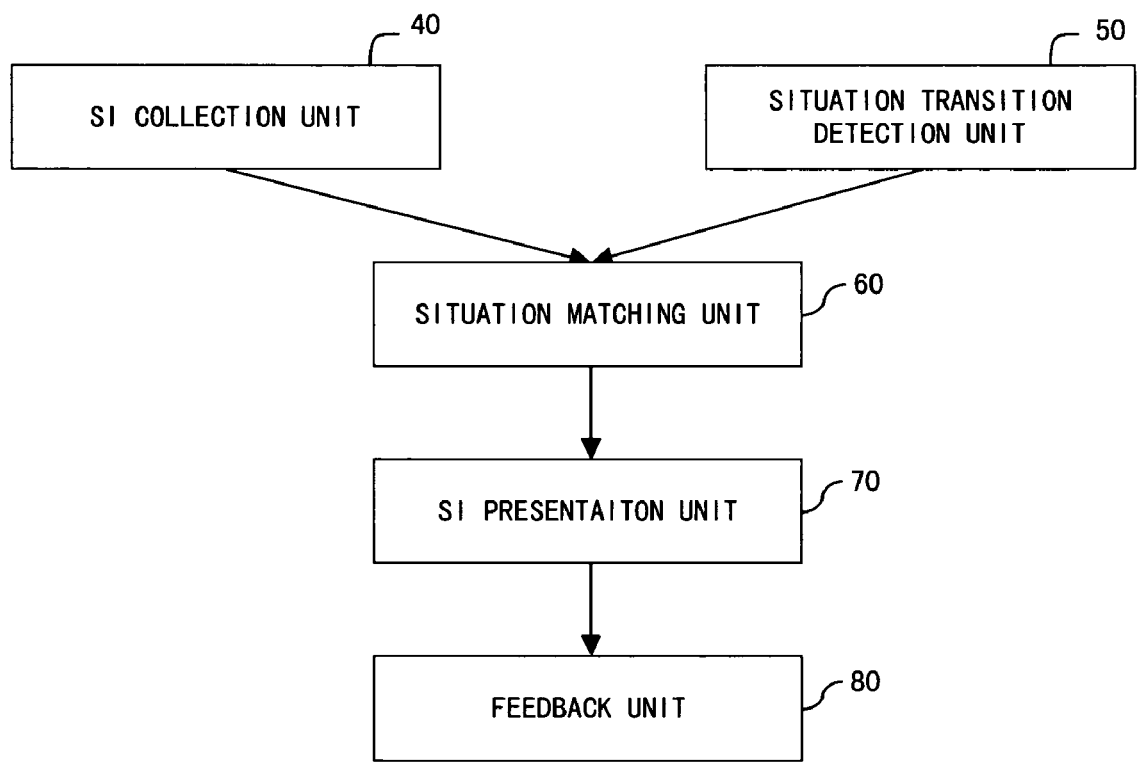
F I G. 1 1

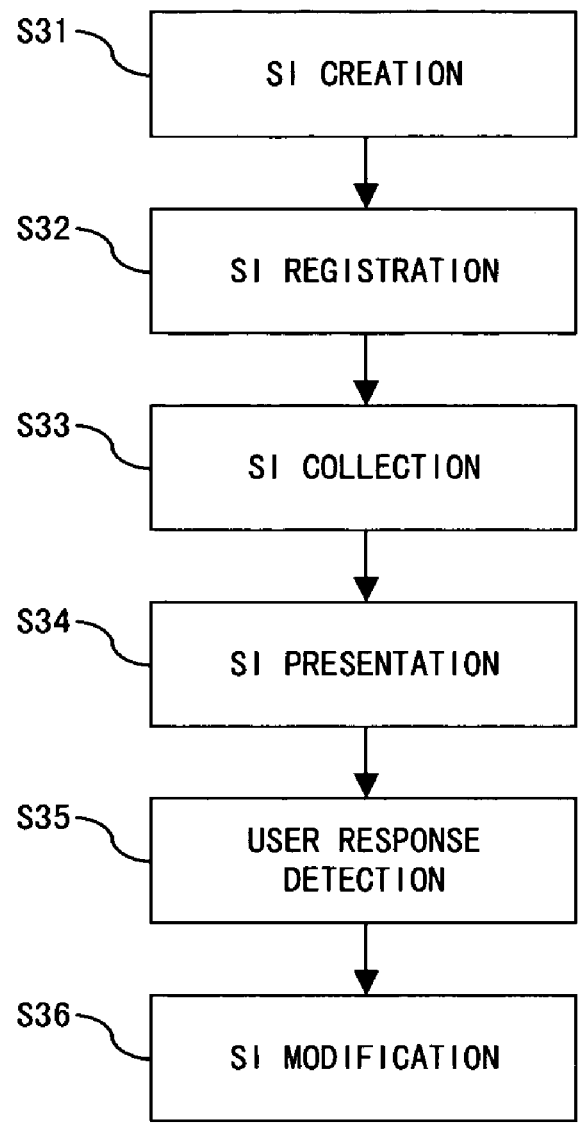
F I G. 1 5

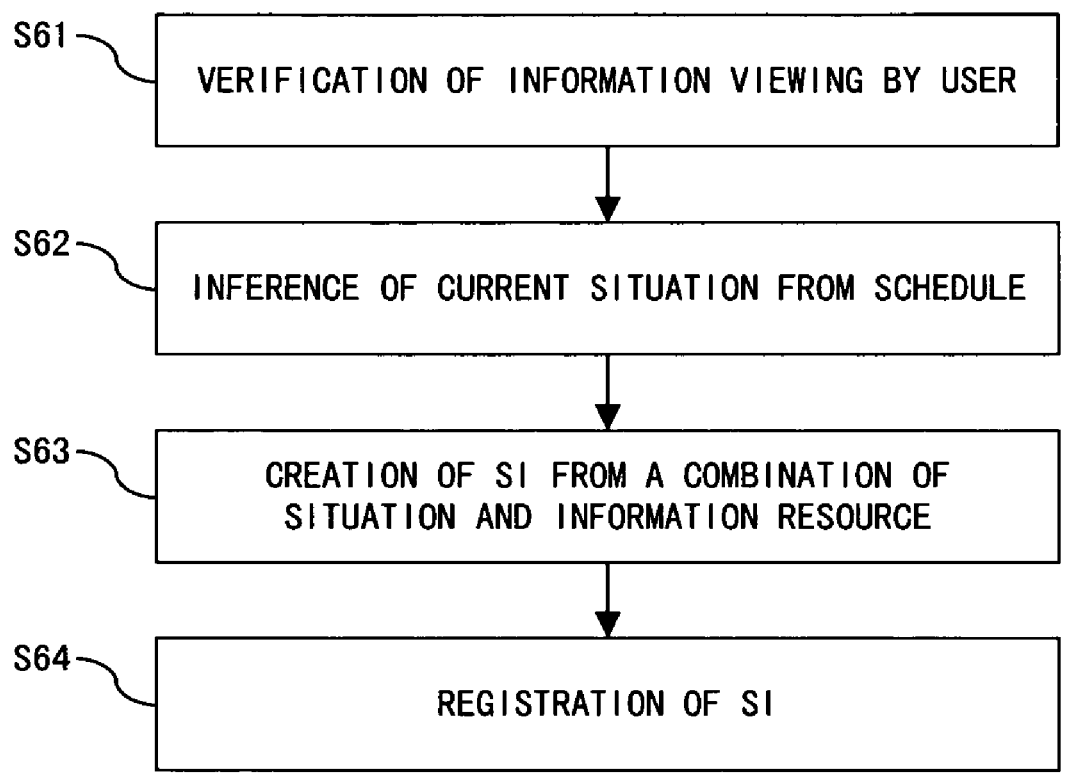
F I G. 1 8

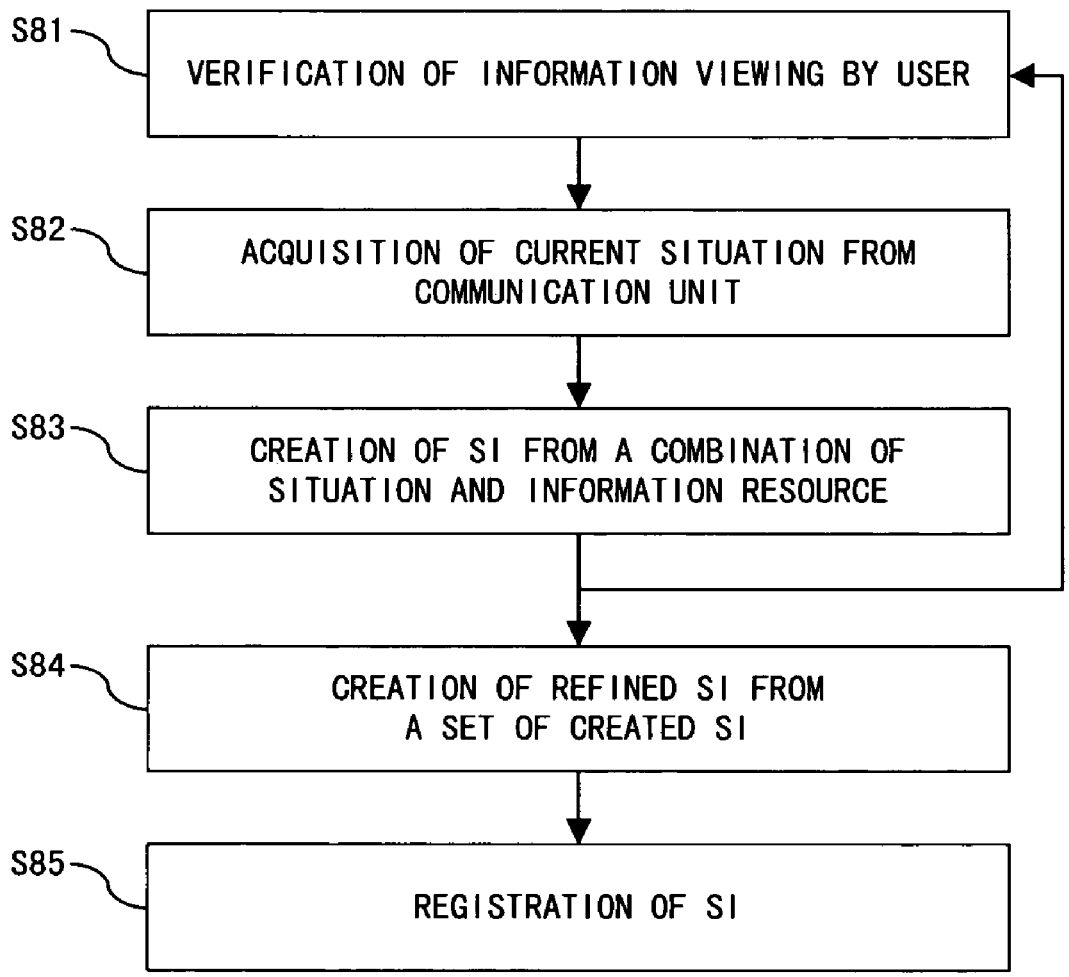
F I G. 2 0

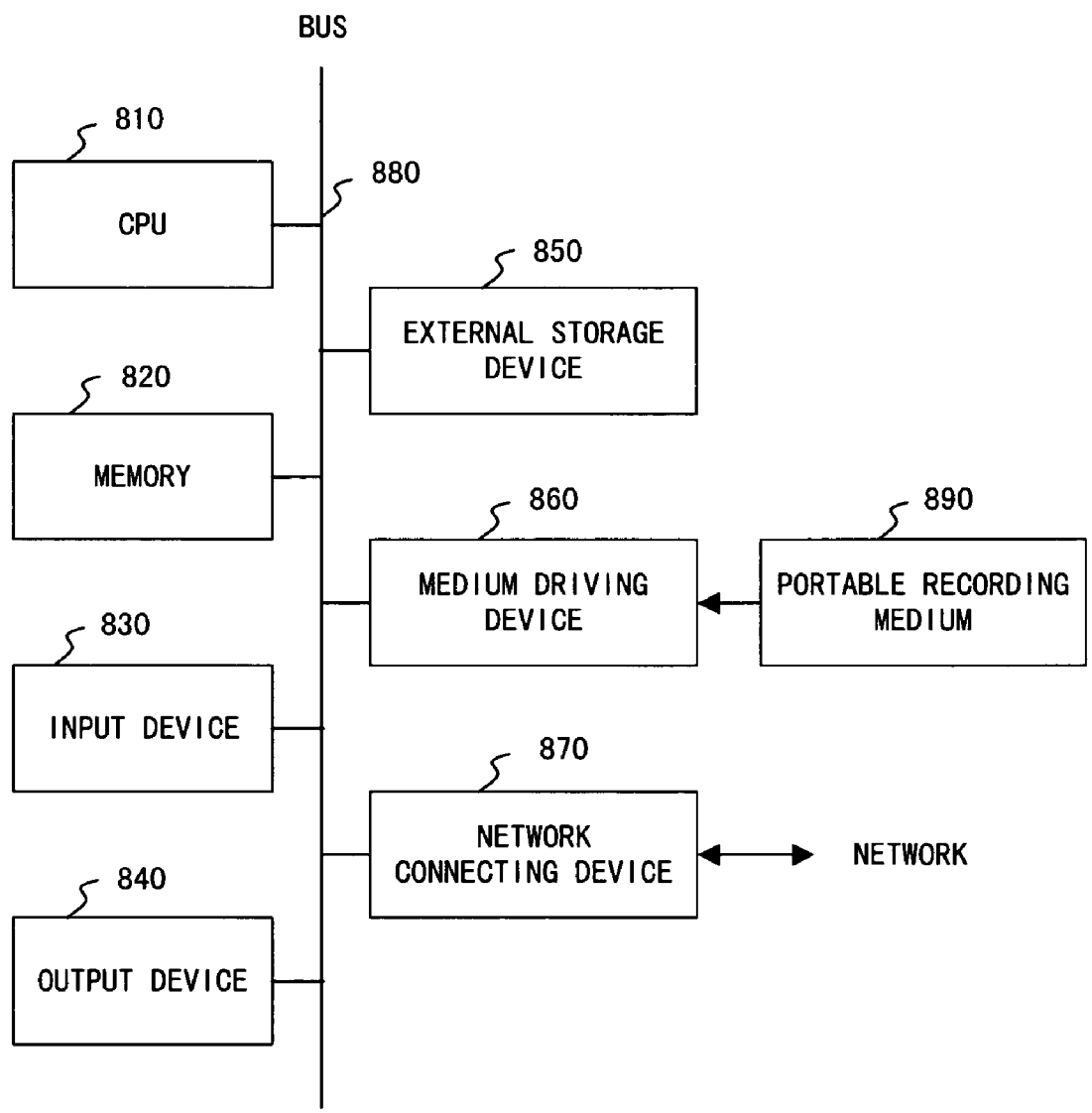
F I G. 2 6

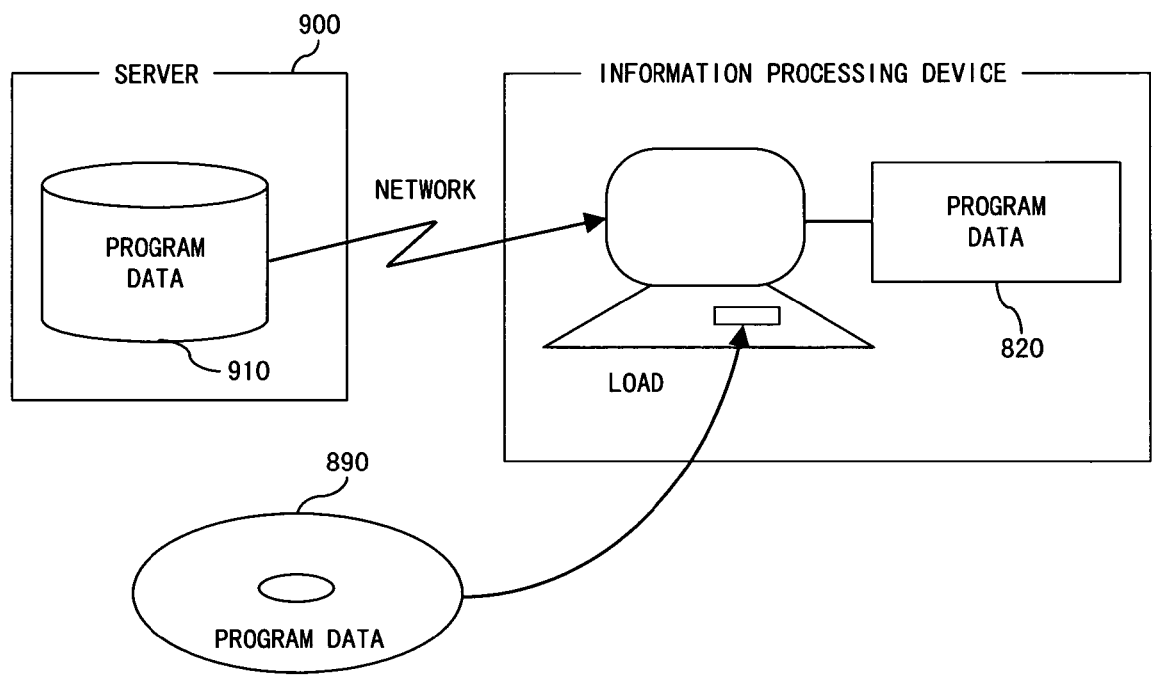
F I G. 2 7

DEVICE AND METHOD FOR PROCESSING SITUATED INFORMATION

CROSS REFERENCE TO RELATED APPLICATION

This application is a continuation of international PCT application No. PCT/JP02/08579 which was filed on Aug. 26, 2002.

BACKGROUND OF THE INVENTION

1. Field of the Invention

The present invention relates to a device and a method for processing situated information obtained by adding situation information, which includes user and peripheral conditions and expresses the situation where information resource is useful (effective), to the information resource. Technological fields wherein such situated information is utilized include those listed below and the like:
Ubiquitous computing <URL: http://www.ubicomp.org>Pervasive computing <URL: http://www.nist.gov/pc2001/; http://www.pervasive2002.org/>
  HCI (Human Computer Interaction)
  Context-Aware Computing
  Internet contents distribution technology
  Information acquisition support technology in Web systems
  Mobile computing
  Semantic web 2. Description of the Related Art Technologies such as (1) to (4) below are given as background art of the present invention.

(1) Web Information Search System

Attempts are being actively made to acquire useful information from web systems, not only by mere keyword searches, but also by implementing link structures and hierarchical structures existing within the web systems and information such as web browsing histories of users. Google (registered trademark) <URL: http://www.google.com> is popular because accurate and pertinent pages can be found by searches based on PageRank, which is drawn on the concept of "pages with links from many quality pages are, in turn, quality pages" (for example, refer to Non-patent Reference 1)

Non-Patent Reference 1

Special feature "Information acquisition support technology in Web systems", The Japanese Society for Artificial Intelligence Journal, Vol. 16. No. 4, 2001/07, pp. 494-534.

According to searches such as this, the fact that the search itself implements keywords does not change, even though pages which have more pertinence can be found compared to searches held solely by simple keywords.

In addition, the majority of pages found on the Web are written in HTML (Hyper Text Markup Language), and while appropriate for humans to read, it is not suited for automatic processing by machines. Therefore, Semantic Web<URL: http://www.w3.org/2001/sw/>project, wherein metadata and meanings which can be understood by machines are added, is receiving attention. Through this web, it becomes easier for machines to comprehend information contents. However, this alone cannot enable the extraction of information suitable for a user situation, even if information adhering to the meanings is found.

Moreover, technology, such as Yahoo! (registered trademark), wherein information is categorized manually and users find necessary information by following category layers, exists. However, this categorization is based on content as well, and does not respond to situations and scenes where the necessity for the information arose.

(2) Information Personalization Technology

Several technologies which customize information catered to user preferences exist. For example, there is filtering technology which enables omission of unnecessary information or acquisition of only information desired by the user out of the multitude of transmitted information, and agent technology which complies with user requests and gathers information meeting these requests.

These technologies utilize information such as user preferences and statistical attributes, and cannot customize information based on situations which change with lifestyle and behavior. Even information suited to one's preferences has little to offer in the way of effectiveness if they cannot be viewed when necessary.

(3) Situation-Friendly Information Provision System

Several systems which provide information adhering to situations have been developed. For example, there are systems wherein maintenance information is projected on head mount displays during printer maintenance using mixed reality technology (for example, refer to Non-patent Reference 2), and information on books in a bookshelf is projected when the user is standing in front of the shelf (for example, refer to Non-patent Reference 3).

Non-Patent Reference 2

Steve Feiner, Blair Macintyre, and Doree Seligmann, "Knowledge-based augmented reality," Communications of the ACM, Vol. 36, No. 7, pp. 52-62, 1993

Non-Patent Reference 3

Jun Rekimoto and Katashi Nagao, "The world through the computer: Computer augmented interaction with real world environments," In Proceedings of the ACM Symposium on User Interface Software and Technology (UIST '95), pp. 29-36, 1995

These systems generally prepare databases, acknowledge ID for verifying positions and individuals, and present corresponding information. In addition, systems which, based on the actions made by the user, learn what should be presented during the next action are being devised (for example, refer to Non-patent Reference 4 and Patent Reference 5).

Non-Patent Reference 4

N. Marmasse and C. Schmandt, "Location-Aware Information Delkivery with ComMotion," In Proceedings of International Symposium on Hand held and Ubiquitous Computing (HUC 2000)

Patent Reference 1

PCT International Application International Publication WO99/40524 Pamphlet, "ACTION PROPOSING DEVICE"

A large number of information provision systems which accommodate time and location, in particular, have been developed. For example, services called "reminders" which notify the user by e-mail and other ways before a specified time based on the user's schedule are well-known as information provision based on time (cf. Yahoo! (registered trademark) Calendar <URL: http://calendar.yahoo.com/>). Also, the following examples are known as information services based on location.

Location-related reminders which notify when a certain person reaches a certain location (for example, refer to Non-patent References 4 and 5)

Non-Patent Reference 5
A. Dey and G. Abowd, "CybreMinder: A Context-Aware System for Supporting Reminders," In Proceedings of International Symposium on Hand held and Ubiquitous Computing (HUC 2000)
Guidance systems based on location (for example, refer to Non-patent References 6, 7, and 8)

Non-Patent Reference 6
G. W. Fitzmaurice, "Situated information spaces and spatially aware palmtop computers," Communications of the ACM, Vol. 36, No. 7, pp. 38-49, 1993

Non-Patent Reference 7
T. Hollerer, et al., "Exploring MARS: developing indoor and outdoor user interfaces to a mobile augmented reality system," In Computers and Graphics, Vol. 23, No. 6, Elsevier Publishers, pp. 779-785, 1999

Non-Patent Reference 8
S. Long, et al., "Rapid Prototyping of Mobile Context-Aware Applications: The Cyberguide Case Study," Proc. 2nd Ann. Int'l Conf. Mobile Computing and Networking (Mobicom96), ACMPress, NewYork, pp. 97-107, 1996
Cooltown project (for example, refer to Non-patent References 9 and 10)

Non-Patent Reference 9
S. Pradhan, et al., "Websigns: Hyperlinking Physical Locations to the Web," Computer, August, pp. 42-48, 2001

Non-Patent Reference 10
"cooltown," <URL: http://www.cooltown.hp.com>
Services which utilize NVML (registered trademark) which provides information based on routes (for example, refer to Patent References 2 and 3)

Patent Reference 2
Japan Patent application Publication No. 2000-215211, "Guidance information presentation device, guidance information presentation processing means, etc."

Patent Reference 3
Japan Patent application Publication No. 2001-306590, "Guidance information presentation device, guidance information presentation processing means, etc."
Context Tool Kit, a middle-ware for constructing applications which acknowledge context and perform processing (context-aware computing) (for example, refer to Non-patent References 11 and 12)

Non-Patent Reference 11
"Context tool Kit," <URL: http://www.cc.gatech.edu/fce/contexttoolkit>

Non-Patent Reference 12
A. Dey, G. Abowd, and D. Salber, "A Conceptual Framework and a Toolkit for Supporting the Rapid Prototyping of Context-Aware Applications," Human Computer Interaction, 2001, Vol. 16, pp. 97-166, <URL: http://wwwl.ics.uci.edu/jpd/NonTradUI/SpecialIssue/anchor.pdf>
However, the systems mentioned above create and utilize data which enables output of information accommodating situations based on each system, and does not attempt to present various scattered information accommodating situations. Since information is created in various systems, to utilize only information created for a specific system limits the information which can be used.

(4) Means for Adding Additional Information to Information
Several methods for sending information to which headers and metadata have been attached can be seen in the internet world. The HTTP (Hyper Text Transfer Protocol) header added when sending HTML and MIME headers attached to e-mails are some of the prototypes. In Semantic Web Activity, attempts are being made to attach metadata such as knowledge and ontology, logic, verification information, trust information, and signature to data such as HTML and XML (extensible Markup Language). Furthermore, there is a specification called Dublin Core <URL: http://dublincore.org/> which regulates basic metadata set, such as signature and creation date, which are added to documents.

Data which are added through these methods adhere to the contents of the information or communication protocols. Therefore, the type of additional information to be added based on the information itself or communication means and the like can be decided upon creation.

Conventional technologies (1) to (4), described above, have problems such as 1. to 5. below:

1. An incredible amount of knowledge and information is already being released over the Web. However, because this also includes much useless and out-dated information, it is difficult to find necessary information through keyword searches. Additionally, even when information is categorized, in many instances, the user does not know which category the desired information falls under, and finding necessary information is often difficult.

Furthermore, although a plethora of information exists, not only on the Web but also in corporate databases and personal local hard discs (e-mail and files), they are not being utilized effectively. Therefore, a method which effectively utilizes the vast amount of existing information is desired.

2. Situations where information becomes necessary are when a person wants to do something (sometimes, what this "something" is may not be clear), when some sort of trouble arises, and the like. In most cases, users must seek out information themselves. Even if information is obtained through news or push services, it may not necessarily have been needed at the time of reception, and therefore, must be sought out again when the need arises.

In addition, although users attempt to acquire information according to individual situations or actions they are planning on taking, they do not know how to search for the necessary information. Even when taking into consideration manuals and dictionaries such as encyclopedias, most are organized by entries, and it is difficult to find pertinent information based on situations (based on necessity).

Furthermore, because the creators of information do not add situations where the information will be required to the information itself, the information is not utilized by users when necessary and is inefficient. Therefore, a method which makes information acquisition easier is desired.

3. Presenting certain information or performing certain actions in certain situations is a common technology in existing robotic systems and information systems. These systems can be realized with relative ease if all that is required is creating customized data with rules and making presentation possible, in compliance to the system.

In this case, however, a rule system must be made for each system, and even if similar rules can be implemented in a plurality of systems, they must be made individually. Therefore, efficiency declines in both creation of the rule system and maintenance (rule update). In addition, the wealth of information produced by other people cannot be effectively utilized.

Moreover, the created rule base is normally customized for situations which are known to occur and, therefore, situation-matching and utilization are easy. However, processing such as that described below becomes necessary to utilize situated information which is generally made available.

gather information because it is scattered in various locations;

search for similar information because information may not necessarily match;

filter unnecessary information; and perform appropriate processing when a plurality of information matches.

Most of these problems do not occur when utilizing a database of a closed world. Therefore, a method which presents general situated information accommodating current situations is desired.

4. Weather information, road information, and the like are created individually by organizations studying weather or roads. Information such as these is often provided separately divided into sections managed by individual methods. At the same time, the individual user wants to acquire information pertinent to the current or future situation en masse. For example, it would be convenient if information related to a situation (event), such as a picnic outing over the weekend, could be extracted en masse.

Ordinarily, users want to know the route they plan to take or optional routes to get to the same destination as road information and the weather at the destination as weather information. It would be convenient if information customized for the user such as this could be extracted easily from the original information resource. Therefore, a method for finding the connecting point between convenience, from the viewpoint of information users, and ease, from the viewpoint of information creators, is desired.

5. Users, at times, have difficulty in finding even information which they had once viewed. If they do not know where they saw the information, users must search by means such as the following:

(a) search websites (perform a search using the same keyword(s) or look at the information if it is bookmarked)

(b) search e-mails (perform search by, for example, using Outlook (registered trademark) keyword search tool, or by sorting e-mails within folders in the order of names and dates)

(c) search local files (perform search using file search tools, or inside files using word find commands)

(d) search information in paper media (perform search relying solely on memory)

(e) determine if information was seen in somebody's presentation (perform search by making inquiries to people who come to mind)

While it is difficult to find information efficiently by methods (d) and (e), one will be hard-pressed to do so even by methods (a) to (c), if appropriate keywords do not come to mind, because searches are based on keywords and dates. Therefore, a method for finding information which one has seen before easily is desired.

SUMMARY OF THE INVENTION

An object of the present invention is to provide a device and a method for effectively presenting scattered information to a user according to situations. This object involves issues such as these below:

1. effectively utilize the vast amount of existing information
2. facilitate information acquisition
3. pertinently present information of a general situation accommodating current situations 4. find the connecting point between convenience, from the viewpoint of information users, and ease, from the viewpoint of information creators 5. Find information one has seen before In the conventional general information, identification information was not included in the information itself, and identification had to be performed by the information user. In contrast, in the present invention, the addition of situation conditions to information is proposed, based on the hypothesis that "all information has an appropriate situation where it should be utilized." Examples of appropriate situations where information should be utilized will be hereinafter explained.

The present invention relates to a device and a method for creating, distributing, presenting, maintaining (modifications, deletions, etc.) this situated information. In order to add additional information on the kind of scene the information will be utilized from the user's point of view, it must be added according to the kind of situation (scene) where the information will be used, rather than the content of the information itself. Therefore, metadata for situation conditions is added through interaction with actual situations (scenes). By utilizing additional information such as this, easy extraction of information accommodating situations becomes possible.

In a first aspect of the present invention, the information provision device comprises a memory unit, a registration unit and a collection unit.

The memory unit stores situated information which is obtained by adding, to an information resource, situation information representing a situation where the information resource becomes useful by stating information which specifies an entity utilizing the information resource, a target of an action of the entity, a spatial situation where the information resource becomes effective, a temporal situation where the information resource becomes effective, an internal situation (affect, motivation, etc.) of the entity, and a method for actualizing the action of the entity. The registration unit registers the situated information to the memory unit, and the collection unit collects the situated information from the memory unit and provides the situated information.

The memory unit, registration unit and collection unit corresponds respectively to, for example, SI memory unit 200, SI registration unit 150, and SI collection unit 40 in the aftermentioned FIG. 1, and the entity using the information resource corresponds to, for example, people such as users and objects such as ubiquitous computers.

Furthermore, situation information corresponds to, for example, after-mentioned situation conditions, and the information which specifies the entity, the target of the action of the entity, the spatial situation where the information resource becomes effective, the temporal situation where the information resource becomes effective, the internal situation of the entity, and the method for actualizing the action of the entity corresponds to, for example, each of the basic terms, who, what, where, when, why, and how, which are included in the situation conditions.

In a second aspect of the present invention, the information provision device comprises a collection unit, a detection unit, a matching unit, and a presentation unit.

The collection unit collects situated information which is obtained by adding, to an information resource, situation information representing a situation where the information resource becomes useful by stating information which specifies an entity utilizing the information resource, a target of an action of the entity, a spatial situation where the information resource becomes effective, a temporal situation where the information resource becomes effective, an internal situation of the entity, and a method for actualizing the action of the entity. The detection unit detects a current situation of the entity, and the matching unit performs a matching process of the situation information included in the situated information collected by the collection unit and the current situation detected by the detection unit. The presentation unit presents to the entity an information resource to which situation information, which fits the current situation, is added.

The collection unit, matching unit, and presentation unit corresponds respectively to, for example, SI collection unit 40, situation matching unit 60, and SI presentation unit 70 in FIG. 1. In addition, the detection unit corresponds to, for example, current situation assessment unit 20 and situation transition detection unit 50.

In a third aspect of the present invention, the information provision device comprises a collection unit, a prediction unit, a matching unit, and a presentation unit.

The collection unit collects situated information which is obtained by adding, to an information resource, situation information representing a situation where the information resource becomes useful by stating information which specifies an entity utilizing the information resource, a target of an action of the entity, a spatial situation where the information resource becomes effective, a temporal situation where the information resource becomes effective, an internal situation of the entity, and a method for actualizing the action of the entity. The prediction unit predicts a transition of a situation of the entity, and the matching unit performs a matching process of the situation information included in the situated information collected by the collection unit and the situation predicted by the prediction unit. The presentation unit presents an information resource to which the situation information, which fits the predicted situation, is added.

The collection unit, prediction unit, matching unit, and presentation unit corresponds respectively to, for example, SI collection unit 40, situation transition prediction unit 100, situation matching unit 60, and SI presentation unit 70 in FIG. 1.

In a fourth aspect of the present invention, the information provision device comprises a monitor unit, detection unit, creation unit, and registration unit.

The monitor unit monitors an information resource which viewed by an entity utilizing an information resource. The detection unit detects information which specifies the entity, a target of an action of the entity, a spatial situation where the entity is laid, a current temporal situation, an internal situation of the entity, and a method for actualizing the action of the entity as a current situation of the entity. The creation unit creates situated information by adding situation information representing the current situation detected by the detection unit to information resource observed by the monitor unit, and the registration unit registers the created situated information.

The monitor unit, detection unit, creation unit, and registration unit corresponds respectively to, for example, information viewing situation monitor unit 10, current situation assessment unit 20, SI creation unit 30, and SI registration unit 150 in FIG. 1.

In a fifth aspect of the present invention, the information processing device comprises a memory unit and processing unit.

The memory unit stores situated information which is obtained by adding, to an information resource, situation information representing a situation where the information resource becomes useful by stating information which specifies an entity utilizing the information resource, a target of an action of the entity, a spatial situation where the information resource becomes effective, a temporal situation where the information resource becomes effective, an internal situation of the entity, and a method for actualizing the action of the entity. The processing unit performs a process using the situated information.

The memory unit and processing unit corresponds respectively to, for example, memory 820 and CPU (Central Processing Unit) 810 in the after-mentioned FIG. 26.

In a sixth aspect of the present invention, the information provision device is placed in an environment and comprises a download unit and processing unit.

The download unit regularly downloads from an internet situated information which corresponds to a location of the information provision device, out of situated information which is obtained by adding, to an information resource, situation information representing a situation where the information resource becomes useful by stating information which specifies an entity utilizing the information resource, a target of an action of the entity, a spatial situation where the information resource becomes effective, a temporal situation where the information resource becomes effective, an internal situation of the entity, and a method for actualizing the action of the entity. The processing unit provides a service to a user utilizing the information provision device using the downloaded situated information.

The download unit corresponds to, for example, SI collection unit 40 in FIG. 1 or network connection device 870 in FIG. 26 and the processing unit corresponds to, for example, memory 820 and CPU 810 in FIG. 26.

In a seventh aspect of the present invention, the information provision device comprises a detection unit and presentation unit.

The detection unit detects a physical situation of a space surrounding a user, and the presentation device selects information according to the detected situation and presents the user with the selected information.

The detection unit corresponds to, for example, the current situation assessment unit 20 and situation transition detection unit 50 in FIG. 1, and the presentation unit corresponds to, for example, SI presentation unit 70 in FIG. 1.

In an eighth aspect of the present invention, the information provision device comprises a detection unit and presentation unit.

The detection unit detects whether a user is a person within an organization or a person outside of the organization, and the presentation device selects information according to the detected result and presents the user with the selected information.

The detection unit corresponds to, for example, the current situation assessment unit 20 and situation transition detection unit 50 in FIG. 1, and the presentation unit corresponds to, for example, SI presentation unit 70 in FIG. 1.

In a ninth aspect of the present invention, the information provision device comprises a detection unit and presentation unit.

The detection unit detects a target of an action of a user, and the presentation device selects information according to the detected target and presents the user with the selected information.

The detection unit corresponds to, for example, the current situation assessment unit 20 and situation transition detection unit 50 in FIG. 1, and the presentation unit corresponds to, for example, SI presentation unit 70 in FIG. 1.

In a tenth aspect of the present invention, the information provision device comprises a detection unit and presentation unit.

The detection unit detects motivation of an action of a user, and the presentation device selects information according to the detected motivation and presents the user with the selected information.

The detection unit corresponds to, for example, the current situation assessment unit 20 and situation transition detection unit 50 in FIG. 1, and the presentation unit corresponds to, for example, SI presentation unit 70 in FIG. 1.

In an eleventh aspect of the present invention, the information provision device comprises a detection unit and presentation unit.

The detection unit detects a method for actualizing an action of a user, and the presentation device selects information according to the detected method and presents the user with the selected information.

The detection unit corresponds to, for example, the current situation assessment unit 20 and situation transition detection unit 50 in FIG. 1, and the presentation unit corresponds to, for example, SI presentation unit 70 in FIG. 1.

BRIEF DESCRIPTION OF DRAWINGS

FIG. 9 is a diagram showing the first SI provision process;

FIG. 10 is a diagram showing the second SI provision process;

FIG. 11 is a diagram showing the third SI provision process;

FIG. 15 is a flow chart of the entire process;

FIG. 18 is a flow chart of the third SI creation process;

FIG. 20 is a flow chart of the fifth SI creation process;

FIG. 26 is a block diagram of an information processing device; and

FIG. 27 is a diagram showing recording media.

BEST MODE OF CARRYING OUT THE INVENTION

Figure 1:
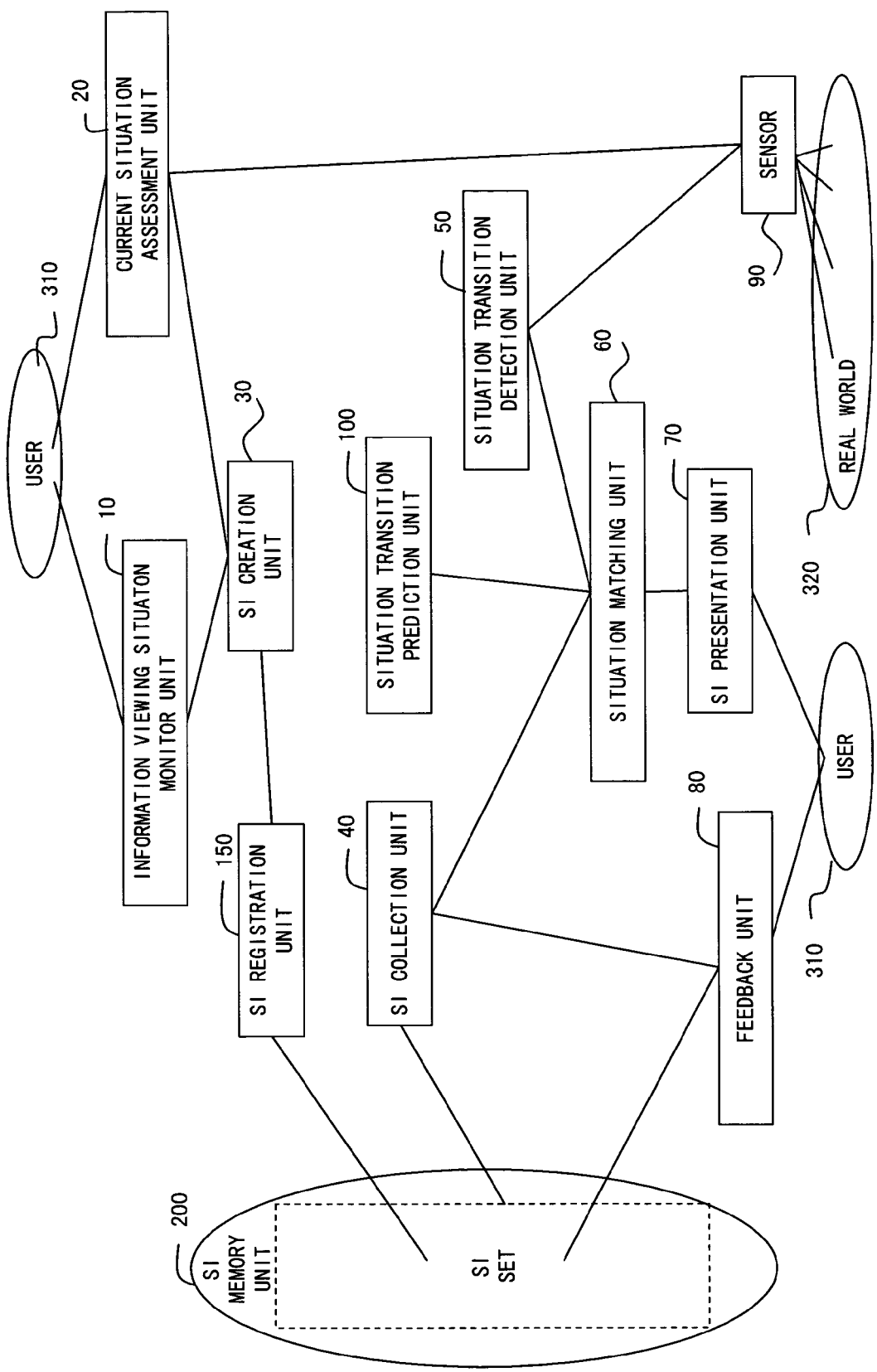
FIG. 1 is a principle diagram of an information system according to the present invention.

Hereinafter, embodiments according to the present invention are described in detail, in reference to diagrams.

First of all, we will explain terms frequently used in the description.

Information Resource (Resource)

Information content itself is referred to, here, as information resource or resource. Information resource (resource) refers to digital objects which are useful when a user takes some sort of action, such as multi-media contents which exist on the web or as local files and include documents (HTML documents, Word documents), images, video images, audio and others, documents sent as e-mail, and executable programs including Java (registered trademark) applet, script and others.

Furthermore, objects which exist in other forms of media such as paper are also included if there exists some sort of method to indicate these objects. Information resource (resource) may refer to a single object or a set of objects.

Situation Condition

Situation condition is a description of a situation appropriate for utilizing an information resource (resource). It refers, here, to user and peripheral states which are expressed based on 5W1H.

Situated Information

Situated information is an information resource (resource) to which situation conditions, which make the information resource effective, are added. It is hereinafter referred to as SI. Words which are synonymous with "situated" include the following:

context-aware adaptive reactive responsive context-sensitive environment-directed Next, we will explain the description method for situated information. Situation conditions are stated as metadata which are added to information. In other words, situation conditions are expressed by six basic terms: who; what; where; when; why; and how. These six basic terms are called Situation Metadata Element Set (SMES).

A person or object receiving a resource states, according to the basic terms, in which kind of state the situation accommodating the situation conditions, indicated by each of the basic terms, is for the resource to be effective. For example, in the XML tag format, it is stated as a tag element (if it is stated as <when> 10:00 </when>, the information resource to which this situation condition is added becomes effective when the time is 10 o'clock). A summary of the basic terms (basic element types) in SMES and the contents thereof are as follows:

Element Type: Who

Definition and comment: states an expression which indicates a person/object, or a set of persons/objects, which is effective in receiving a resource. Classifications according to statistical classification studies: {gender, age, race, etc.}, social standing: {position, occupation}, level: {novice, expert}, inside/outside organization: {insider, outsider}, and others, are stated.

Element Type: What

Definition and comment: states a target person/object or task of an action performed by a person/object for which a resource is suited. If it is suited for a person driving a car, the car falls under this element. If it is suited for a person speaking to a certain person, this certain person falls under this element. If it is suited for a person/object performing a certain task, this task falls under this element.

Element Type: Where

Definition and comment: states a spatial or physical situation which is effective in receiving a resource. Descriptions of a scene are also included. The simplest description of a spatial situation is a locative expression.

Element Type: When

Definition and comment: states a temporal situation which is effective in receiving a resource.

Element Type: Why

Definition and comment: states under what kind of objective, motivation, or affect a person/object, for which the resource is targeted, takes action.

Element Type: How

Definition and comment: states which means are used by the person/object for which the resource is targeted. This element relates to the methodology for achieving objectives. Information such as whether an operation is performed manually or by using a computer is stated. Capabilities (screen size, baud rate, etc.) of the device currently in use can also be described. In this case, a link to the value of CC/PP (Composite Capabilities/Preference Profiles <URL: http://www.w3.org/Mobile/CCPP/>) only is also acceptable.

Furthermore, a situation qualifier, which refines the meaning of the basic element type, is defined for a more precise metadata description. There are situation qualifiers for element refinement and for clarification of units and description rules (scheme) (Element Encoding Scheme). The followings are examples of a part of situation qualifiers for refinement and description rules.

Element Type: Who

Situation qualifier for "who": demographics

Meaning, role, and description rule: classifications based on statistical classification studies {gender, age, race, etc.} are stated.

Situation qualifier for "who": social-rank

Meaning, role, and description rule: the social standing {position, occupation} is stated. Corporate employee, self-employed, chef, student, teacher, department manager, section manager, etc.

Situation qualifier for "who": experience-level

Meaning, role, and description rule: the level {novice, expert} is stated.

Situation qualifier for "who": affiliation

Meaning, role, anddescriptionrule: organization name, inside or outside organization {insider, outsider} are stated.

Element Type: What

Situation qualifier for "what": object

Meaning, role, and description rule: the object to which an action is targeted is stated. *a Situation qualifier for "what": person Meaning, role, anddescriptionrule: the person to which an action is targeted is stated. *a Situation qualifier for "what": task Meaning, role, and description rule: the task to which an action is targeted is stated. *a Situation qualifier for "what": attention Meaning, role, and description rule: the object which the resource target (person receiving and utilizing SI) focuses attention on is stated.

Element Type: Where

Situation qualifier for "where": name

Meaning, role, and description rule: the name of the location is stated. NVML (registered trademark) standard.

Situation qualifier for "where": latitude

Meaning, role, and description rule: the latitude is stated. NVML (registered trademark) standard. *b Situation qualifier for "where": longitude Meaning, role, and description rule: the longitude is stated. NVML (registered trademark) standard. *b Situation qualifier for "where": address Meaning, role, and description rule: the address is stated. NVML (registered trademark) standard.

Situation qualifier for "where": range

Meaning, role, and description rule: the range is stated. For example, m (meter) is used as the unit.

Situation qualifier for "where": physical-surroundings

Meaning, role, and description rule: objects such as surrounding buildings and walls which physically exist in the vicinity are stated.

Situation qualifier for "where": surrounding-condition

Meaning, role, and description rule: physical conditions of the surrounding area, such as temperature, humidity, smell, and noise level are stated.

Element Type: When

Situation qualifier for "when": instance

Meaning, role, and description rule: indicated by one point in time. Refer to notation of International Standard ISO8601 (for example, Non-patent Reference 13).

Non-Patent Reference 13

M. Kuhn, "A Summary of the International Standard Date and Time Notation," <URL: http://www.cl.cam.ac.uk/~mgk25/iso-time.html>.

Situation qualifier for "when": period

Meaning, role, and description rule: the effective date, day of the week, time range and the like are stated. Refer to specifications of International Standard ISO8601 and vCalendar (for example, Non-patent Reference 14).

Non-Patent Reference 14 vCalendar, "The Electronic Calendaring and Scheduling Exchange Form at Version 1.0," A Versit Consortium Specification, Sep. 18, 1996.

Situation qualifier for "when": expire

Meaning, role, and description rule: the expiration date is stated. The contents of the resource become invalid after the date stated here.

Element Type: Why

Situation qualifier for "why": objective

Meaning, role, and description rule: the objective of the action is stated. *a

Situation qualifier for "why": motivation

Meaning, role, and description rule: the motivation behind the action is stated. *a Situation qualifier for "why": emotion Meaning, role, and description rule: the affect is stated. *c Element Type: How Situation qualifier for "how": means Meaning, role, and description rule: the actualization method for the action is stated. *a Situation qualifier for "how": device Meaning, role, and description rule: the capabilities of the device (screensize, resolution, baud rate, etc.) are stated. A link to the value of CC/PP only is also acceptable.

In the examples of situation qualifiers for refinement above, "action" in the sentences indicated with *a refers to action performed by the operation entity who will most likely utilize the resource related by these metadata. If the person/object utilizing the resource desires information regarding actions currently being performed, situations related to the current action is input. If information regarding action which is being planned is desired, situations related to the future action are input. If the input situation and the metadata of the situation condition (situation metadata) match, a resource related to the metadata is provided to the operation entity.

Furthermore, latitude and longitude, indicated by *b, must be written in pairs. Articles related to sensors which detect "affect" in the sentence indicated by *c are found, for example, in Non-patent References 15 and 16.

Non-Patent Reference 15

R. W. Picard, "Affective Computing, " MIT Press, Cambridge, 1997

Non-Patent Reference 16

W. Ark, D. C. Dryer, and D. J. Lu, "The Emotion Mouse," Proceedings of the HCI International '99 Conference, Munich, Germany, Aug. 24 to 26, 1999

In addition, the following specifications, for example, can be used as situation qualifiers for scheme clarification.

Situation qualifier for "when" element: International Standard ISO8601

Situation qualifier for "where" element: specification of NVML (registered trademark), specification of GML (Geography Markup Language)

Situation qualifier for "how" element: specification of CC/PP

Specific notations of situated information can be realized by adding situation metadata to an information resource or by linking an information resource to situation metadata. Although several specific realization methods can be considered, herein, the following methods (1) to (4) are given as addition methods as metadata of HTML and RDF (Resource Description Framework).

(1) Embedding Situation Metadata Within HTML

This indicates a method for stating metadata by embedding SMES within an HTML document. The individual terms of SMES are indicated by implementing the meta element in HTML 4.0 (refer to Non-patent Reference 8 for example). The term for Situation is stated with the prefix S. to the name attribute, and its value is stated in the content attribute. For example, if the metadata of the location and time convenient for receiving information is stated in an HTML document on restaurant information implementing this means, it would be as follows:
<meta name="S.where" content="near Tokyo Station">
<meta name="S.when" content="around noon">

At the same time, to indicate that this prefix S. refers to the term for Situation, it is linked to the SMES namespace using the link element in HTML 4.0 as below. It is, for example, stated as follows:
<link rel="S.Schema"href="http://purl.org/situation/elements/1.0/">

In an HTML document, the situation qualifier of element type refinement is stated as the suffix of the SMES type name stated in the name attribute of the meta element, and the situation qualifier for scheme clarification is stated as scheme attribute. For example, it is stated as follows:
<meta name="s.where.latitude" content="N35.40.39.0">
<meta name="s.where.longitude"content="E139.46.18.1">
<meta name="s.when.instance" content="10:00">
<meta name="s.where.latitude"scheme="NVML" content="N35.40.39.0">

(2) Describing Situation Metadata by RDF

The terms of the metadata can be expressed as properties of RDF, as well. When using RDF, the element name of SMES is used as the property name upon making a declaration which links the SMES namespace to an appropriate prefix such as s:.

The following is the same example as that in HTML in (1) expressed in XML syntax of RDF.

```
<rdf:RDF
xmlns:rdf="http://www.w3.org/1999/02/22-rdf-syntax-ns#"
xmlns:s="http://purl.org/situation/elements/1.0/"
xml:lang="en">
    <rdf:Description
    rdf:about="http://www.resaurantA.com/tokyo/">
        <s.where>near Tokyo Station</s:where>
        <s.when>around noon</s:when>
    </rdf:Description>
</rdf:RDF>
```

In RDF, the situation qualifier of refinement is stated directly as an element indicating property, as is with the basic elements. The relation with basic element type is defined by RDF schema as sub Property of. For example, it is written as follows:

```
<?xml version="1.0"?>
<rdf:RDF
xmlns:rdf="http://www.w3.org/1999/02/22-rdf-syntax-ns #"
xmlns:rdfs="http://www.w3.org/2000/01/rdf-schema#"
xmlns:s="http://purl.org/situation/elements/1.0/"
xmls:sterms="http://purl.org/situation/terms/"
xml:lang-"en">
    <rdf:Description
    rdf:about=
    "http://www.restaurantA.com/tokyo/index.htm">
        <sterms:period> 11:30 / 13:00 </sterms:period>
        <sterms:latitude>
            <sterms:NVML>
                <rdf:value> N35.40.39.0 </rdf:value>
            </sterms:NVML>
        </sterms:latitude>
        <sterms:longitude>
            <sterms NVML>
                <rdf:value> E139.46.18 .</rdf:value>
            </sterms:NVML>
        </sterms:longitude>
            <sterms:range > 200m </sterms:range>
    . . . . . .
    </rdf:Description>
    <rdf:Description
    rdf:about="http://purl.org/s/terms/period">
        <rdfs:subPropertyOf
        rdf:resource=
        "http://purl.org/s/elements/1.0/when"/>
    </rdf:Description>
    <rdf:Description
    rdf:about="http://purl.org/s/terms/latitude">
        <rdfs:subPropertyOf
        rdf:resource=
        "http://purl.org/s/elements/1.0/where"/>
    </rdf:Description>
    . . . . . .
    . . . . . .
</rdf:RDF>
```

(3) Linking External RDF Metadata to HTML Document

Metadata stated in RDF can be saved to an external file or the like and linked to an HTML document or a XML document, rather than being directly embedded within the document. The description example is as follows:
<link rel="meta" href="restaurantA.html.rdf">

In this case, a declaration such as that below must be made to enable use of the link type rel="meta".
<head profile="http://purl.org/net/uriprofile/">

(4) Expressing by XML

When expressing by an ordinary XML structure which does not depend on a certain specification, it is written as follows:

```
<SituatedInformation>
    <situation>
        <where> near Tokyo Station </where>
        <when> around noon </when>
    </situation>
    <info title="A_restaurant">
        <text> Italian
            lunch service time 11:00-14:00
            ... </text>
        <image src="uri://restaurantA.com/menu.jpg"/>
    </info>
</SituatedInformation>
```

Next, we will explain the structure and operation of an information system which performs creation, distribution, presentation, and maintenance of SI. FIG. 1 is a principle block diagram of the information system in an embodiment according to the present invention. The information system in FIG. 1 comprises information viewing situation monitor unit 10, current situation assessment unit 20, SI creation unit 30, SI collection unit 40, situation transition detection unit 50, situation matching unit 60, SI presentation unit 70, feedback unit 80, sensor 90, situation transition prediction unit 100, SI registration unit 150, and SI memory unit 200 as modules.

The information viewing situation monitor unit 10 monitors what information resource a user 310 is viewing and if it infers that a certain information resource is being viewed, it transfers the fact to another module. The followings, among others, are methods for monitoring and inferring:

Request information for an information resource is used. For example, if there is request information in HTTP protocol, identification information of this information resource is output. URI (Uniform Resource Identifier), for example, can be used as identification information. Aside from this, actions such as selecting menu, requesting by speech, sending commands, and pushing buttons can be used as request methods.

Opening/closing information (whether or not a file is opened) of an information resource is used. Upon verifying that user 310 has opened the information resource, identification information of this file is output.

If the amount of time user 310 opens a page exceeds a certain amount of time, it is inferred that the user 310 has seen the information resource.

If the amount of time user 310 opens an active window (the foreground window) exceeds a certain amount of time, it is inferred that the user 310 has seen the information resource.

Analysis is performed on Web viewing log.

The focal point of user 310's eyes is monitored by a camera. If the target in focus for more than a certain amount of time is an information resource, it is inferred that the user has seen this information resource.

If music or specific software is an information resource, the starting time and state are recognized.

Specifications for information viewing situation monitor 10 are as follows:
Status: resident
Input (trigger input): none
Output:
    information viewing verification notice
    URI of the information resource (or pursuant ID) or XML data of the information resource

EXAMPLE 1

```
<info>
    <text> Platform 1,2: Chuo Line
        Platform 3: Keihin-Tohoku Line (Omiya)
        Platform 4: Yamanote Line (Ueno)
        ... </text>
    <voice> Tokyo station is the entrance of capital Tokyo
        and famous for Renaissance-style red brick
        building
        ... </voice>
    <image src = "image/tokyo-station.jpg"/>
</info>
```

Current situation assessment unit 20 uses sensor 90 and the like to detect and assesses the current situation of user 310 from real world 320. Recognition methods of individual situations are as follows. who:
    advanced registration for services
    face image recognition by camera
    speaker recognition through speech recognition
    biometrics (iris and fingerprint)
    level determination with a utilization situation of software and hardware
    acquisition of personal information using P3P (Platform for Privacy Preferences) <URL: http://www.w3.org/P3P>what:
    recognition of software and hardware in operation (what operation mode it is performing in)
    recognition of target task during operation
    image processing
    task analysis from the software being used, the information resource being viewed, and the like where:
    Triangulation. Arrival time interval, direction, phase and the like are used. GPS (Global Positioning System), D (Differential) -GPS, RTK (real time kinematic) -GPS, Snaptrack (registered trademark), NNSS (Navy Navigation Satellite System), Loran (long range navigation), NDB (non-directional radio beacon), Radar (radio detecting and ranging), and SLA (side looking airborne radar).
    Proximity. Cell ID of mobile phones, beacon (ABS (Active Badge System), Active Bats, Clicket), touch sensor, IR (infrared ray) sensor
    Scene analysis→image analysis, microphone array
    Other
    acceleration sensor+integrator
    magnetic sensor
    lay floor with pressure sensors
    door sensor. Identification information is input at the entrance by biometrics, such as iris or fingerprint, and ID cards. →whether or not user 310 is in a certain closed space can be determined.
    user 310 uses something which is fixed→for example, if user 310 logs in by typing to a fixed computer, it becomes known that user 310 is there.

when:
    clock, GPS, internet
why:
    advanced input
    recognition of emotions by detecting sweat and the like
    analysis of expression on face image
how:
    recognition of a utilization method of software and hardware in operation
    acquisition by CC/PP of information related to hardware equipment being used Current situation assessment unit 20 converts information obtained by sensor 90 to the situation expression of 5W1H described above. If sufficient information cannot be obtained through sensor 90, schedule management unit 110 in aftermentioned FIG. 4 performs a match using a schedule input by user 310 and a partial key (time or location), and supplements information such as what, why, and how. In addition, user 310 can use an input interface to directly input the current situation.

EXAMPLE 2

In a ubiquitous computing environment, a computer embedded in an environment can assess its location and situation and transmit this information. For example, computers embedded in the walls and floor of a train station send out information stating that this location is AA station (information such as that below).
<situation>
    <where> AA station </where>
</situation>
By acquiring information from these ubiquitous computers, the current situation can be obtained. In other words, even if there is no sensor, all that are required are a ubiquitous computer and a communication means.

Specifications of current situation assessment unit 20 are as follows:
Status: resident, or activated when requested
Input: request from SI creation unit 30
Output: 5W1H situation expression, or URI indicating the same SI creation unit 30 creates SI. In adherence to the description method of situated information explained above, SI is created manually by stating directly in text, by using tools, and the like. However, it can be created automatically in the following way.

If it is verified that user 310 is viewing a certain information resource by information viewing situation monitor 10, SI creation unit 30 sends out a request to current situation assessment unit 20 and receives the current situation. If current situation assessment unit 20 is in residence, current situation can be received by checking current situation assessment unit 20 regularly. SI is then created in adherence to the description method of situation information by relating the received situation and information resource.

As a method of creating a more refined SI out of a plurality of SI, there are several embodiments for integrating plural SI, such as adding a large number of situation conditions to one resource or enabling the resource to be extracted in various situations. If SI is collected from one user, a set of SI specialized for the individual is created. However, case examples increase if SI from a plurality of users are collected and integrated, and the possibility that a general SI is created is high.

SI (or a set of SI) created in this way is saved to a memory device on the Web or a local disc, which is SI memory unit 200, via SI registration unit 150.

Specifications for SI creation unit 30 are as follows:
Status: standing by for information from information viewing situation monitor unit 10
Input: information viewing verification notice from information viewing situation monitor 10
Output: SI Technology stated in Patent Reference 1 can also be applied to SI creation unit 30.

SI collection unit 40 collects SI of contents on the Web or contents in local databases and file systems (comprises SI containing the content itself and situation metadata which has information on links to the content) and transmits pertinent SI in adherence to a command from situation matching unit 60.

SI collection is performed in the same way as an ordinary Web page, by a robot-type search engine or a directory service which is classified manually, and the collected SI is sorted.

Realization methods for SI collection 40 can be separated roughly in to two methods.
(1) SI collection unit as a portal site for the general population, such as a search site on the Web.
(2) SI collection unit as an agent specialized for an individual.

In the case of (1), SI for all situations is collected, or mainly SI for situations which generally occur frequently is collected. In this case, by omitting SI with few situation examples through filtering, it is possible to collect SI which is most likely to be utilized widely.

In the case of (2), only SI related to situations which may occur to the individual need be collected, in coordination with situation transition prediction unit 100. In other words, the greater the transition in situations a person has, the larger the amount of SI which needs to be collected.

If a more real-time SI is required, SI must be collected frequently. However, since situations where a certain information resource is necessary do not change much, in general, collection performed regularly will suffice, as is with robot engines which circulate Web pages. In addition, information such as weather forecasts wherein the time of release is known, it is preferable that collection is performed at this timing.

When subsequently exchanging SI between modules, exchange of only URI of SI and exchange of the entity (XML document) itself is possible. In regards to exchange of URI, there is a method wherein URI of the SI itself is exchanged (for example, uri://www.foo.com/some.si) and a method wherein only the information resource part of SI remains as URI. If only the information resource part is stated in URI, SI is stated as below, for example:

```
<SituatedInformation>
    <situation>
        <where> ... </where>
        <when> ... </when>
    </situation>
    <info title="A_restaurant">
        <uri> uri://www.foo.com/some.info </uri>
    </info>
</SituatedInformation>
```

The situation condition part of the SI can be processed by acquiring the actual data through URI if the need for comparison with the situation arises. The information resource part of the SI can be processed by acquiring the actual data through URI if the need for presenting the information resource arises.

Whether exchange is performed with URI or with the entity is appropriately set based on specifications such as the capacity of the local disc, network connection state, access speed, processing speed of each module. Specifications for SI collection unit 40 are as follows:

Status: circulates the Web at an appropriate timing
Input: SI contents on the Web and local disc
Output: collected SI and pertinent SI It is also possible to download an assembled pack of plural pieces of SI, rather than collecting SI one by one (for example, refer to Patent Reference 4).

Patent Reference 4

Japan Patent Application Publication, No. 2001-165766, "Guidance information request device and guidance information presentation device"

Situation transition detection unit 50 maintains sensitivity for individual situations and notifies other modules with "transition in situation" information when sensitivity exceeds a certain degree. A recognition method for each situation is the same as that of current situation assessment unit 20.

Figure 2:
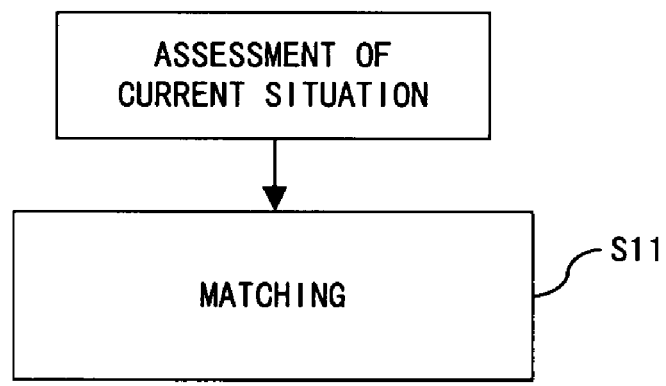
FIG. 2 is a flow chart of the first situation matching process.

Specifications for situation transition detection unit 50 are as follows:

Status: resident
Input: sensor information of each type
Output: notification of transition in situation Situation matching unit 60 performs a match on two situations which has been provided. FIG. 2 is a flow chart showing a situation matching process performed when the system is first activated. Situation matching unit 60 compares a current situation obtained from current situation assessment unit 20 with situation conditions of all SI collected by SI collection unit 40 and pulls out every matching condition (Step S11). However, since a complete match is rare, it is considered to be matching if two conditions fall within the range of a certain degree of similarity. Matching such as this is called fitting.

Subsequently, all situation matching unit 60 needs to do is performing a fitness check on only the changes in situation conditions. In other words, if only the location within the situation has changed, all situation matching unit 60 needs to do is recheck only the location element and determine whether or not the current location fits the location of SI.

Figure 3:
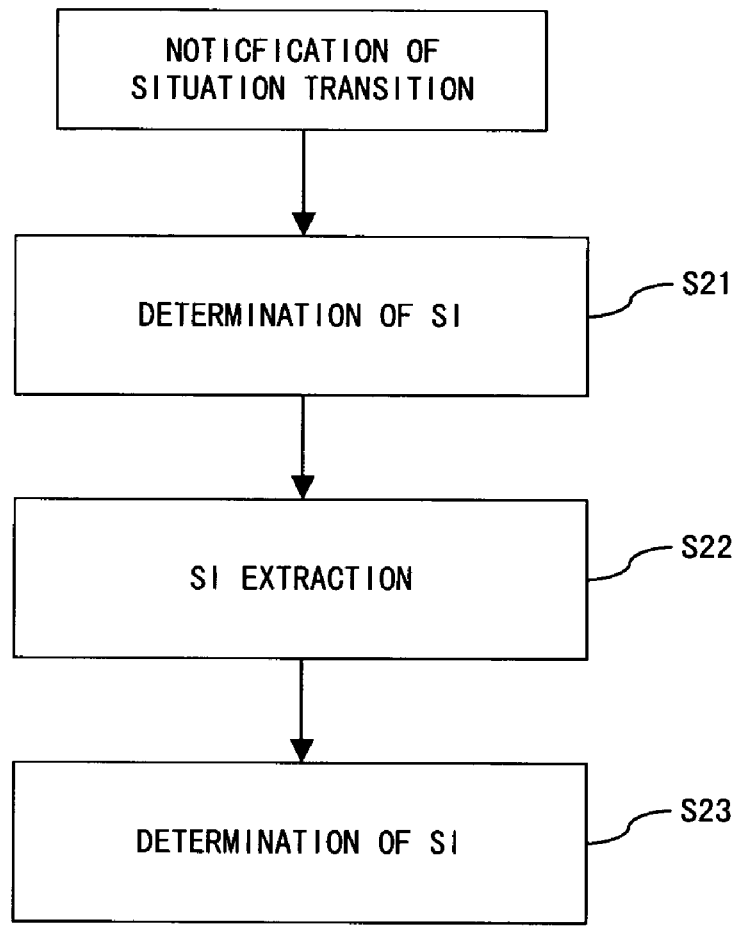
FIG. 3 is a flow chart of the second situation matching process.

FIG. 3 is a flow chart showing the situation matching process performed when a notice of transition in situation is received from situation transition detection unit 50. Situation matching unit 60 first determines whether or not any SI, within SI which had been fitting until this point, has become unfitting due to these notified changes in the situation (Step S21).

Next, SI with descriptions related to an element of the situation that has been changed, within SI which was not fitting until this point, is extracted (step S22), and it is determined whether or not the element corresponding to the changed situation, within extracted SI elements, fits the current situation (Step S23).

By performing a fitting check in this way, on only the situation conditions which has been changed, calculation costs can be curbed, in comparison with performing a fitting check on all elements every time.

In general, situation conditions are considered to fit a current situation entirely only when all situation conditions stated in SI (who, what, where, when, why, how) fit the current situation respectively. However, in regards to conditions not stated in SI, it is considered fitting regardless of the state of the current situation. For example, SI which does not have temporal conditions fits any time.

On the other hand, even if the condition is stated in SI, if sensor 90 and the like cannot acknowledge the corresponding current situation, this SI is considered not to fit the current condition.

Since XML expression of the same structure is used, the contents of the tags are compared when matching separate situations. Respective situation matching methods are as follows.

If the notation system is regulated in the specifications, the matching of tag contents is merely the matching of character string. With numeric values, the range is stated in the conditions of SI and is considered to match if the actual situation falls within this range. For example, when indicating a location, a range centering a certain location is stated in the SI, and it is determined whether or not the location indicated by the latitude and longitude obtained from the current situation falls within this range.

In addition, a simple database which can convert natural language stated in SI into numeric values is prepared. For example, if a character string such as "morning" is stated within the temporal conditions of SI, situation matching unit 60 converts the character string into numeric values using a data list such as that below and performs a fitting check using the obtained numeric values.

| Character String | Numeric Value |
| --- | --- |
| morning | 6:00/10:00 |
| in the morning | 6:00/12:00 |
| noon | 12:00 |
| around noon | 11:30/13:00 |
| afternoon | 12:00/18:00 |
| evening | 16:00/19:00 |
| night | 17:00/23:00 |
| midnight | 24:00 |
| in the midnight | 0:00/3:00 |

Furthermore, if SI is created manually, there are instances where situation conditions are stated in natural language which cannot be converted into numeric values. In this case, matching of the character string of the situation condition and the character string which expresses the result of acknowledgement of the actual situation is performed using a natural language dictionary and the like. Since the targeted element is clearly specified to some extent by tags, it is easier to determine whether it fits or not in comparison to ordinary natural language processing.

In the fitting check above, a determination method by two values, fitting or not, is implemented. However, by utilizing the degree of whether or not it fits (fitness), if the total fitness of each condition exceeds a certain value α, it can be considered fitting. If the fitness of who, what, where, when, why, and how are $F_{who}$, $F_{what}$, $F_{where}$, $F_{when}$, $F_{why}$, and $F_{how}$, this fitting condition can be written as follows:

$$F_{who}+F_{what}+F_{where}+F_{when}+F_{why}+F_{how}>\alpha$$

Here, the number of fitting SI can be modified by appropriately modifying α. If fitting SI cannot be found with the first value of α, SI closest to the current situation can be found by gradually reducing α. If some pieces of SI have already been found, but the user want to know what kind of information can be found if the conditions are widened further, all one has to do is lower α.

Furthermore, as is shown below, it is possible to perform a determination to which an emphasis is added on the certain conditions by multiplying each fitness by weight W. It goes without saying that these settings can be made in more detail for each situation qualifier.

$$W_1 F_{who} + W_2 F_{what} + W_3 F_{where} + W_4 F_{when} + W_5 F_{why} + W_6 F_{how} > \alpha$$

Specifications for situation matching unit 60 are as follows:

Status: activated when situation transition detection unit 50 detects change in the situation or at the predicted time of change in the situation inferred by situation transition prediction unit 100 (a little earlier, taking into consideration processing time)

Input: situation and SI or a set of SI

Output: matching SI and the number of matching SI

SI presentation unit 70 presents SI output from situation matching unit 60 to user 310. However, if a plurality of pieces of SI match the current situation, it becomes necessary to select how to present the pieces of SI. The presentation method in this case is explained later, in reference to FIG. 14. Specifications for SI presentation unit 70 are as follows:

Status: management of information resources currently being presented; activated when situation matching unit 60 detects new SI which fits the current situation Input: SI or the information resource part of SI, or URI Output: output data to display and audio devices Feedback unit 80 detects the response of user 310 to the content of the information presented in SI presentation unit 70 and presentation method and sends feedback to each module. Two types of responses, direct response (performing an operation to view information, answering a simple questionnaire on whether or not information, after presentation, was useful, etc.) and indirect response (whether or not some kind of action corresponding to the information was taken after viewing the information, changes in facial expression, etc.) can be considered as user response.

If the detected response is positive, feedback unit 80 determines the information resource to be suited for the added situation, and the information resource is circulated as is. On the contrary, if the response is negative, it is determined that the information resource is unsuitable for the added situation and the situation condition is detached from the information resource. In this case, this information resource is not circulated until appropriate situation condition is newly added by SI creation unit 30.

Feedback of user response can be performed for the response of each individual user, or for the response of a plurality of users.

In the former case, when negative feedback is received, the situation condition is deleted from the SI contents accumulated for individual use, or processing is performed to prevent the addition of the rejected condition to the corresponding information resource in an SI collection server comprising SI collection unit 40.

In the latter case, when negative feedback is received, the situation condition is deleted from the original SI contents, or processing is performed to prevent the addition of the rejected condition to the corresponding information resource in a SI collection server shared by the plural users (if the same SI content is obtained from the original SI set, this part of the situation condition is deleted).

In this way, it is possible to modify the presentation information by user response feedback. Specifications for feedback unit 80 are as follows:

Status: activated when it is necessary to adjust information resource to the display capabilities of a device and the like when information resource is output Input: positive or negative response from user Output: SI modification command Practicality parameter is added to SI as a control parameter to enhance SI utilization when a positive user response is obtained. Feedback unit 80 increments the value of the practicality parameter when SI is actually utilized and a positive response is obtained. A description example of the practicality parameter is as follows:

```
<SituatedInformation>
    <control>
        <practicality> 1 </practicality>
    </control>
    <situation>
        <where> ... </where>
        <when> ... </when>
    </situation>
    <info title="A_useful_information">
        <uri> uri://www.foo.com/some.info </uri>
    </info>
</SituatedInformation>
```

As utilization method for the practicality parameter, method such as the SI presentation unit 70 prioritizing the presentation of the SI with a larger practicality parameter value (higher practicality) when the situation matching unit 60 outputs a plurality of SI can be considered.

In addition, if the response is negative, in some cases situation condition should not be deleted because of one negative response because the negative response may be due to a reason other than the current situation and in the case of multiple users, response will vary between individuals. Therefore, as another utilization method, when a negative response is received, feedback unit 80 decrements the practicality parameter value and deletes the situation condition when the value becomes lower than a certain value (for example, −10).

Figure 4:
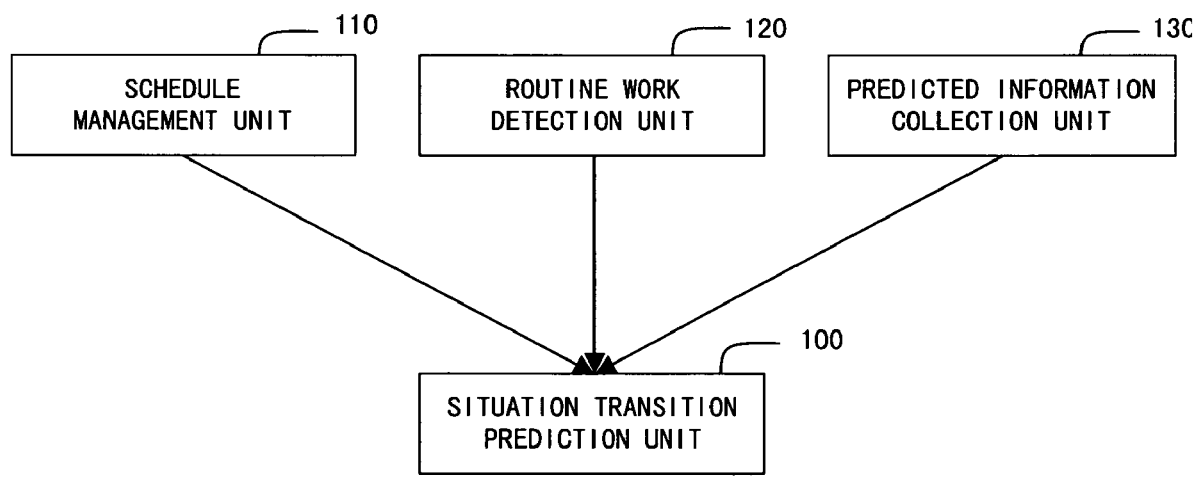
FIG. 4 is a diagram showing a situation transition prediction process.

Situation transition prediction unit 100 oversees an action model of the user, and as is shown in FIG. 4, predicts transitions in a situation of user 310 and the surrounding, based on input from schedule management unit 110, routine work detection unit 120, and prediction information collection unit 130. Schedule management unit 110, routine work detection unit 120, and prediction information collection unit 130 in FIG. 4 are included in the information system in FIG. 1.

Situation transition prediction unit 100 predicts what the situation user 310 may become after a certain amount of time (for example, 15 minutes later) and sends the prediction results to situation matching unit 60. Situation matching unit 60 finds the SI which fits this predicted situation and presents this to user 310.

Since it would be convenient, in some cases, to know before the situation occurs, in regards to information required in a specific situation, in these cases, situation transition prediction unit 100 is used in place of situation transition detection unit 50.

Situation transition prediction unit 100, for example, creates predicted situation data, such as that below, from the hourly location movement information of the user sent from schedule management unit 110 and routine work detection unit 120 and sends the data to situation matching unit 60.

```
<situation>
    <where> office </where>
    <when> 9:00 </when>
</situation>
```

Specifications for situation transition prediction unit 100 are as follows:
Status: resident
Input: routine work data and schedule
Output: 5W1H situation expression indicating predicted situation Schedule management unit 110 has the user input schedule data by ordinary schedule management software such as Outlook (registered trademark) and schedule scripts (for example, refer to Patent Reference 5), and regularly sends this data to situation transition prediction unit 100.

Patent Reference 5
Japan Patent Application Publication No. 2001-92878, "Schedule presentation and corresponding action suggestions/implementation device . . . "

By having the user perform schedule input using 5W1H, accuracy of situation matching is enhanced. Specifications for schedule management unit 110 are as follows:
Status: resident or activated by user
Input: schedule data
Output: schedule information An example of 5W1H situation expression indicating schedule information is as follows:

```
<schedule>
    <situation>
        <where> office </where>
        <when> 9:00 </when>
    </situation>
    ....
    <situation>
        <what>
            <task> eat lunch </task>
        </what>
        <where> cafeteria </where>
        <when> 12:00-13:00 </when>
    </situation>
    ....
    ....
</schedule>
```

Also, by integrating, not only the schedule of the individual user, but also schedules for groups and organizations, event schedules which interest the individual, and the like, the user's predicted schedule which is not written directly in the user's schedule can be inferred.

Routine work detection unit 120 monitors user actions, formulates a cyclic pattern from daily pattern of action, and detects this as routine work. For example, if the user goes to work every morning at 9 o'clock, routine work indicating that the person is in the office at 9 o'clock every morning is detected, even if it is not stated in the schedule. An example of 5W1H situation expression indicating routine work is as follows:

```
<situation>
    <where> office </where>
    <when> 9:00 </when>
</situation>
```

Specifications for routine work detection unit 120 are as follows:
Status: resident
Input: action pattern
Output: 5W1H situation expression indication routine work Technology stated in Patent Reference 1 can also be applied to routine work detection unit 120.

Predicted information collection unit 130 collects various types of predicted information released by various organizations such as weather forecasts and traffic forecasts and sends the information to situation transition prediction unit 100. An example of 5W1H situation expression indication predicted information is as follows:

```
<situation>
    <where>
        <address> A City </address>
        <surrounding-condition> rain
        <surrounding-condition>
    </where>
    <when> evening </when>
</situation>
```

If SI collection unit 40 has still not collected enough SI, it is necessary for SI which accommodates situations which may occur to user 310 to be collected. In this case, based on the prediction results of situation transition prediction unit 100, SI collection unit 40 intensively searches for SI which has situation conditions corresponding thereto. Therefore, it is possible to present information resources quickly when predicted situations arise.

SI registration unit 150 registers SI created by SI creation unit 30 to SI memory unit 200. SI memory unit 200 accommodates all memory devices, such as memory device on the Web (directory on which the Web server is activated) and local hard discs, and stores information on SI. If SI memory unit 200 comprises a plurality of memory devices, these devices are connected and can be accessed by a communication network when being used.

SI memory unit 200 can also store a plurality of SI situation conditions with correlation to each other. In this case, correlation between these situation conditions can be made by linking between two situation conditions. If the situation condition of SI which fits the current situation is correlated to a situation condition of another SI, SI collection unit 40 collects the correlated other SI from SI memory unit 200, and SI presentation unit 70 presents the other SI simultaneously when presenting the suitable SI.

For example, weddings and funerals are each different events, and thereby, indicated by separate situation conditions. However, information for both events can commonly be used, in some cases, as manners for ceremonial functions. In addition, a plurality of events which have a high possibility of occurring in succession, such as wedding ceremony and honeymoon, are indicated, in some cases, by separate situation conditions. If different situation conditions are added respectively to a plurality of similar information resources in this way, it is convenient to have correlation between these situation conditions.

For example, linking the situation condition from being at the platform to be on a train is being described as follows by utilizing XML Linking Language (XLink)<URL:http://www.w3.org/TR/xlink/>.

```
<mylink xlink:type="extended">
    <start xlink:type="resource"
        xlink:label="onPlatform"> Link to inside train
    </start>
    <dest xlink:type="locator"
        xlink:href="http://trainservice.com"
        xlink:label="train"/>
    <go xlink:type="arc" xlink:from=onPlatform"
        xlink:to="train"/>
</mylink>
```

According to the information system described above, effective utilization of existing information becomes possible, and information acquisition becomes easier. Also, general situation condition information can be appropriately presented in adherence to current situation, even without building a special rule system. Therefore, it becomes possible to present information, which is scattered on the Web and the like, effectively according to the situation.

Furthermore, since information creators can easily create SI by implementing the 5W1H situation expression, and users can easily pull out information customized thereto, convenience of the information user and the ease of the creator are both maintained.

Incidentally, if SI is left on the Web or in databases with just the added situation conditions, the contents can be seen even if the situation does not match. Therefore, if one does not want persons (objects) not meeting the conditions to view the SI, this would be a disadvantage. Given this factor, security functions such as that below are installed.

An encryption module is set up in SI registration unit 150, and the information resource part is encoded with a secret key when SI is registered, and at the same time, a public key is provided to SI memory unit 200 and management is entrusted thereto. Communication is held in a bilateral encoded communication mode, obviously, even when providing this public key. SI memory unit 200 manages the public key of each SI through a secure system. SI of which the information resource section remains encoded can be acquired by anyone, but the public key is only provided by the following process:

The reliability of situation matching unit 60 is determined through authentication of situation matching unit 60 by a certificate authority. When information of which the situation fits is sent from a reliable situation matching unit 60, communication is held in a bilateral encoded communication mode between the appliance with this situation matching unit 60 and SI memory unit 200, and the public key is sent from SI memory unit 200. Situation matching unit 60 decodes the information resource part using the received public key and utilizes the resource.

There is a possibility that false matching information, which states that the situation fits in spite of the fact that it does not, is sent from an unauthenticated situation matching unit 60. Therefore, the public key is sent only to reliable situation matching unit 60 which does not send the information unless the situation fits.

If all modules shown in FIG. 1 are mounted onto one information processing device, a local information system can be established. If these modules are distributed and mounted onto a plurality of information processing devices and the devices are interconnected with a communication network, a global information system can be established over the network. In particular, by embedding some of the modules into Web servers, a SI provision Web service can be actualized over the internet.

Figure 5:
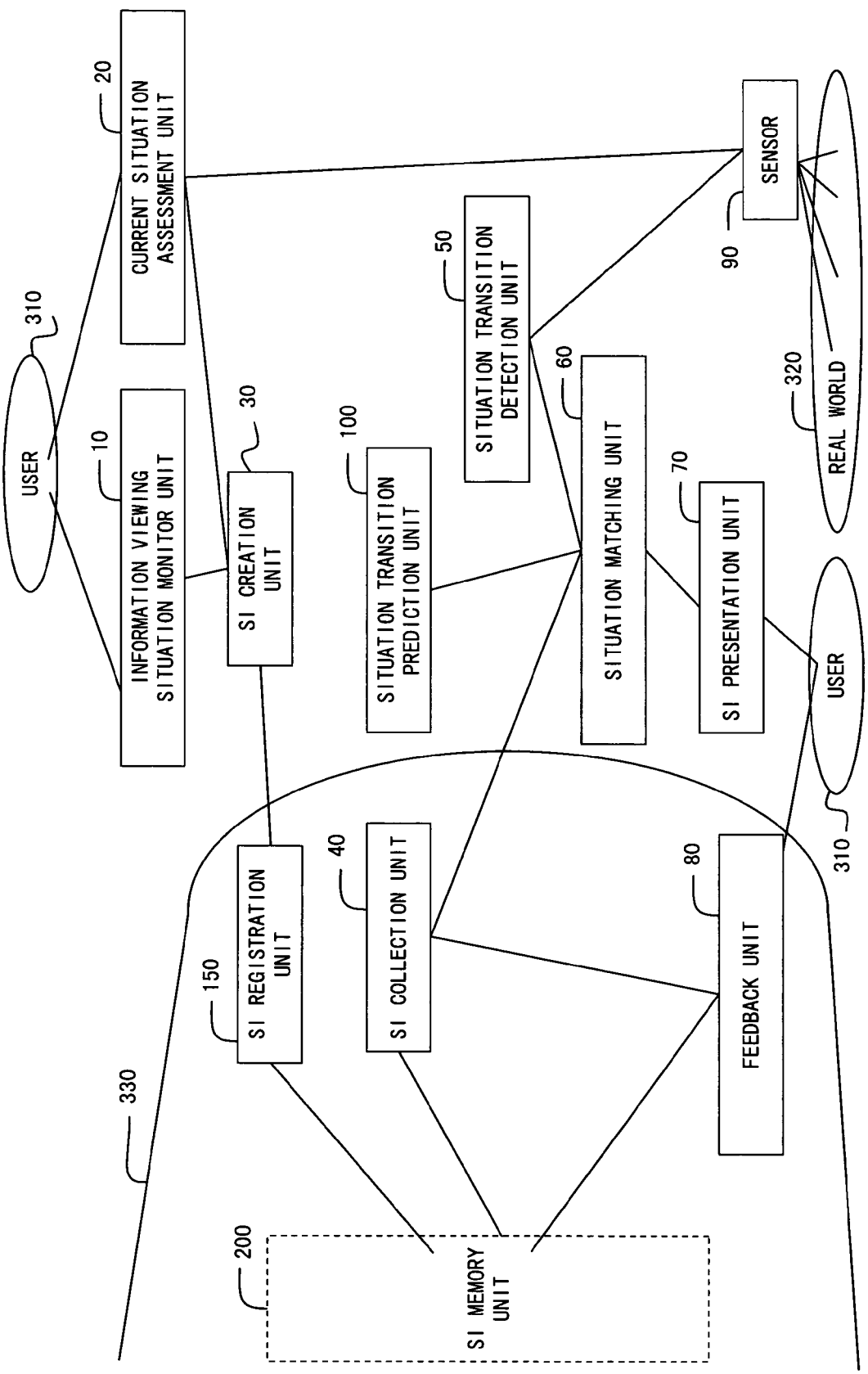
FIG. 5 is a diagram which shows a Web service system.

FIG. 5 shows an example of a Web service system such as this. Web server 330 in FIG. 5 comprises SI collection unit 40, feedback unit 80, SI registration unit 150, and SI memory unit 200, provides SI information, and performs maintenance thereof. In this case, SI collection unit 40 collects SI from SI memory unit 200 and distributes the SI to situation matching unit 60 via the internet. In addition, Feedback 80 feeds back the response of user 310 regarding the distributed SI to SI collection unit 10 and SI memory unit 200.

Figure 6:
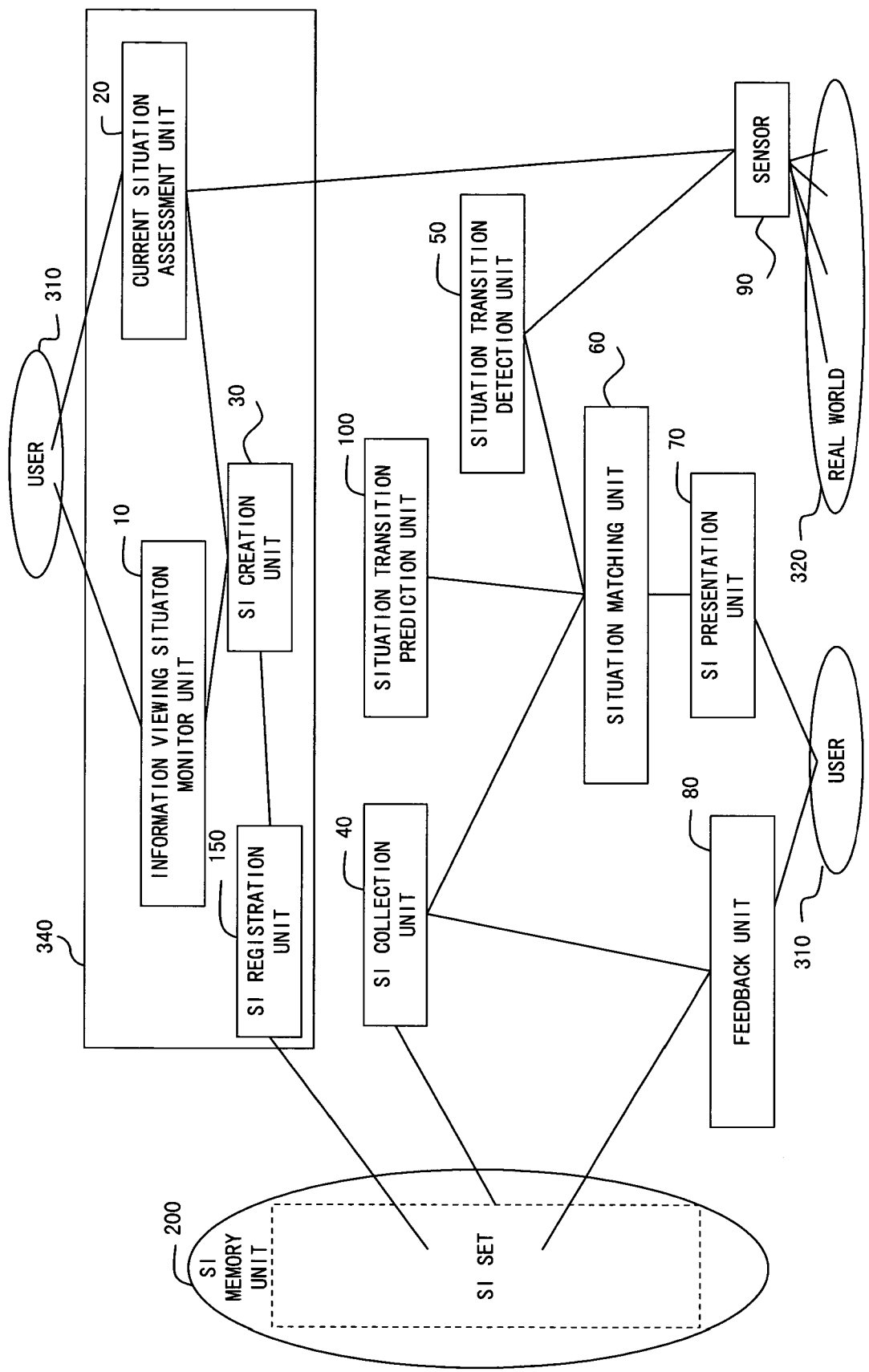
FIG. 6 is a diagram showing an SI creation device.

FIG. 6 shows an SI creation device which creates SI according to the situation. SI creation device 340 in FIG. 6 comprises information viewing situation monitor 10, current situation assessment unit 20, SI creation unit 30, SI registration unit 150, and sensor 90. Information viewing situation monitor 10 and current situation assessment unit 20 can be embedded into a device other than SI creation device, as well.

Figure 7:
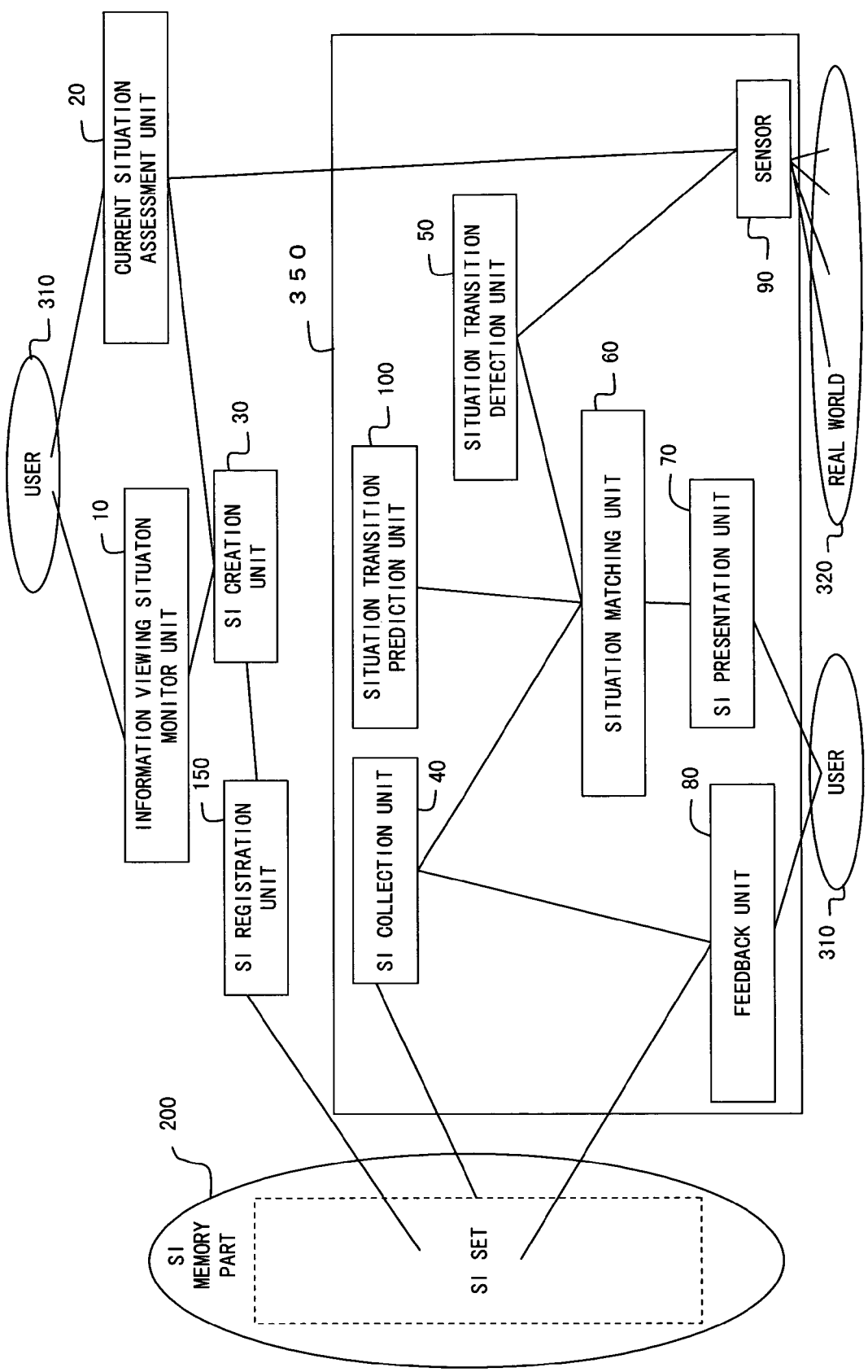
FIG. 7 is a diagram showing an SI provision device.

FIG. 7 shows an SI presentation device which presents SI according to the situation. SI presentation device 350 in FIG. 7 comprises SI collection unit 40, situation transition detection unit 50, situation matching unit 60, SI presentation unit 70, feedback unit 80, sensor 90, and situation transition prediction unit 100. SI presentation device 350 can be provided for each individual user or as a shared device utilized by a plurality of users.

Next, we will explain the relation between the main modules in the system shown in FIGS. 1, 5, 6, and 7, in reference to FIG. 8 to 11.

Figure 8:
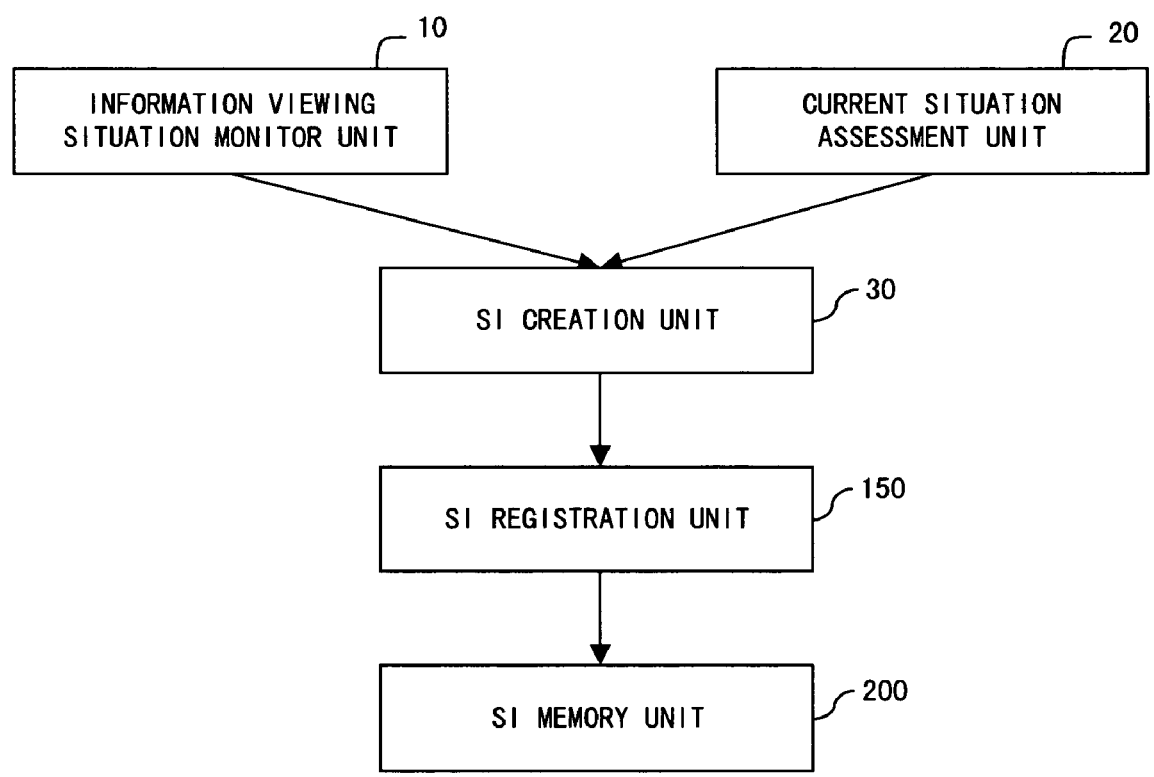
FIG. 8 is a diagram showing an SI creation process.

FIG. 8 shows modules related to SI creation process. SI creation unit 30 creates SI based on information resource currently viewed by the user which is monitored by information viewing situation monitor 10 and current situation of the user detected by current situation detection unit 20. Then, SI registration unit 150 registers SI created by SI creation unit 30 to SI memory unit 200.

FIG. 9 shows modules related to a first SI provision process. Situation matching unit 60 performs a matching process on the situation conditions of SI collected by SI collection unit 40 and situation detected by situation transition detect unit 50, and sends SI which has the situation conditions suitable for this situation to SI presentation unit 70. Then, SI presentation unit 70 presents the received SI.

FIG. 10 shows modules related to a second SI provision process. Situation matching unit 60 performs a matching process on the situation conditions of SI collected by SI collection unit 40 and situation predicted by situation transition prediction unit 100, and sends SI which has the situation conditions fitting this situation to SI presentation unit 70. Then, SI presentation unit 70 presents the received SI.

FIG. 11 shows modules related to a third SI provision process. In this process, after SI is presented by the SI provision process in FIG. 9, feedback unit 80 feeds back user response.

Figure 12:
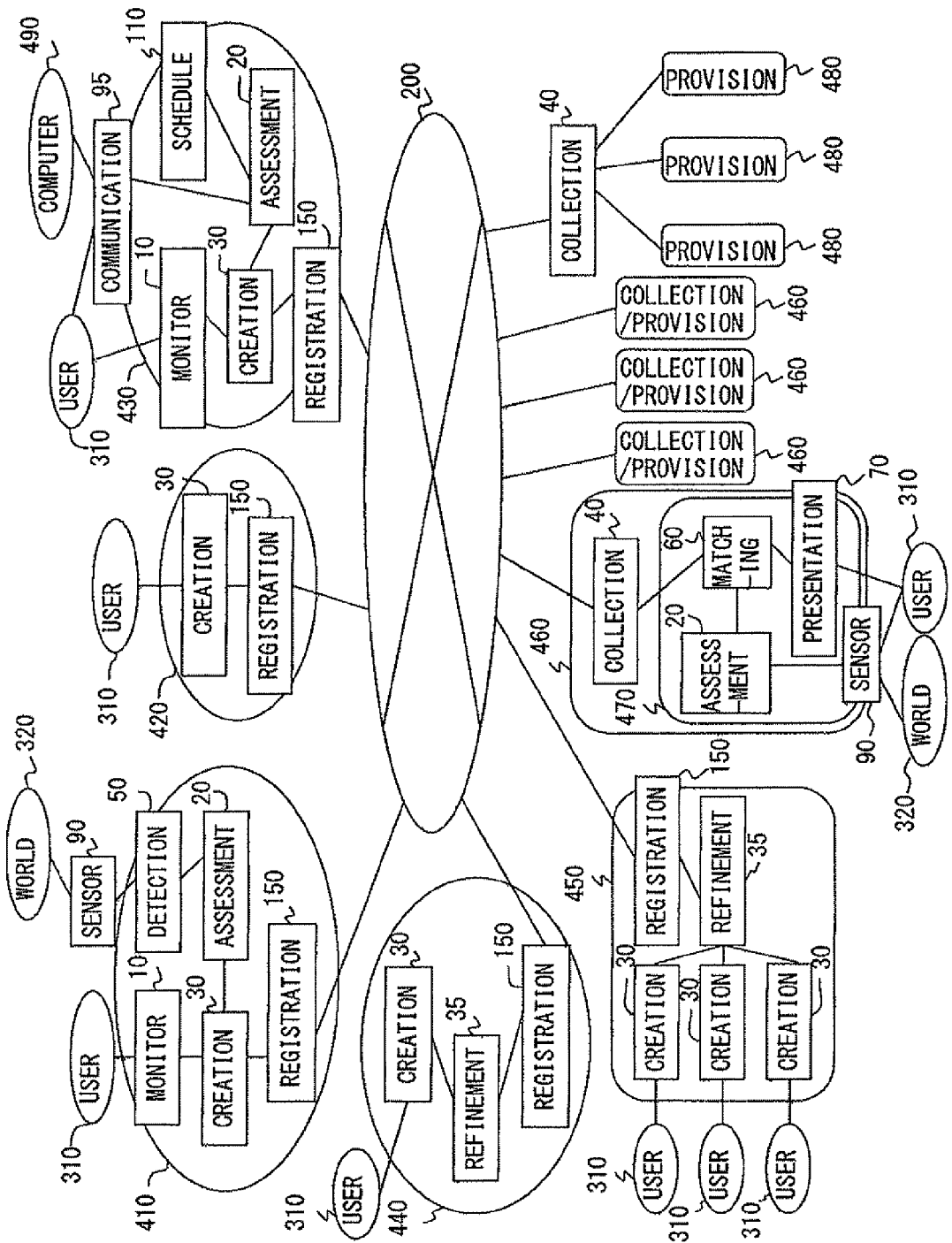
FIG. 12 is a block diagram of the first information system.
Figure 13:
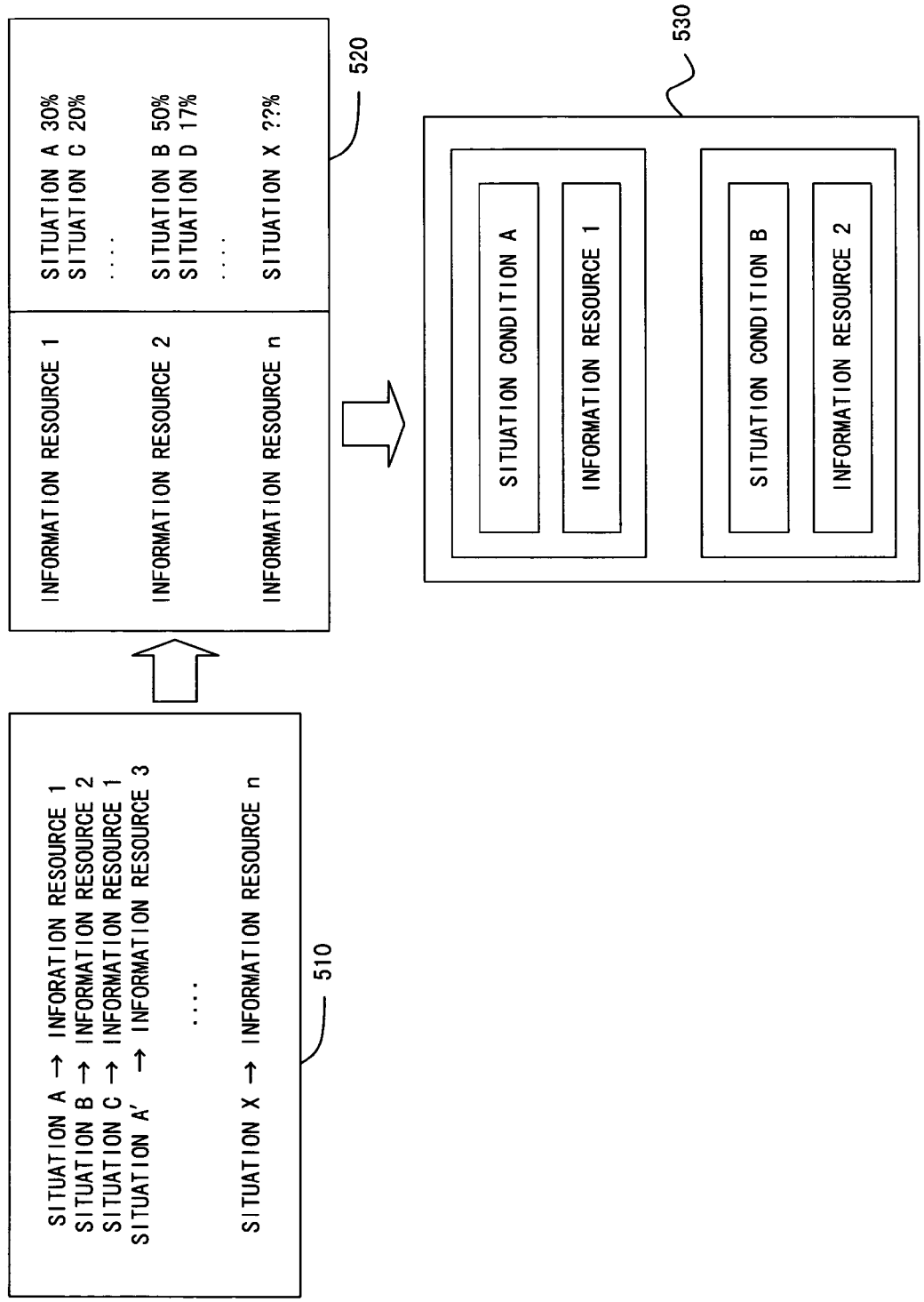
FIG. 13 is a diagram showing a SI refinement process.
Figure 14:
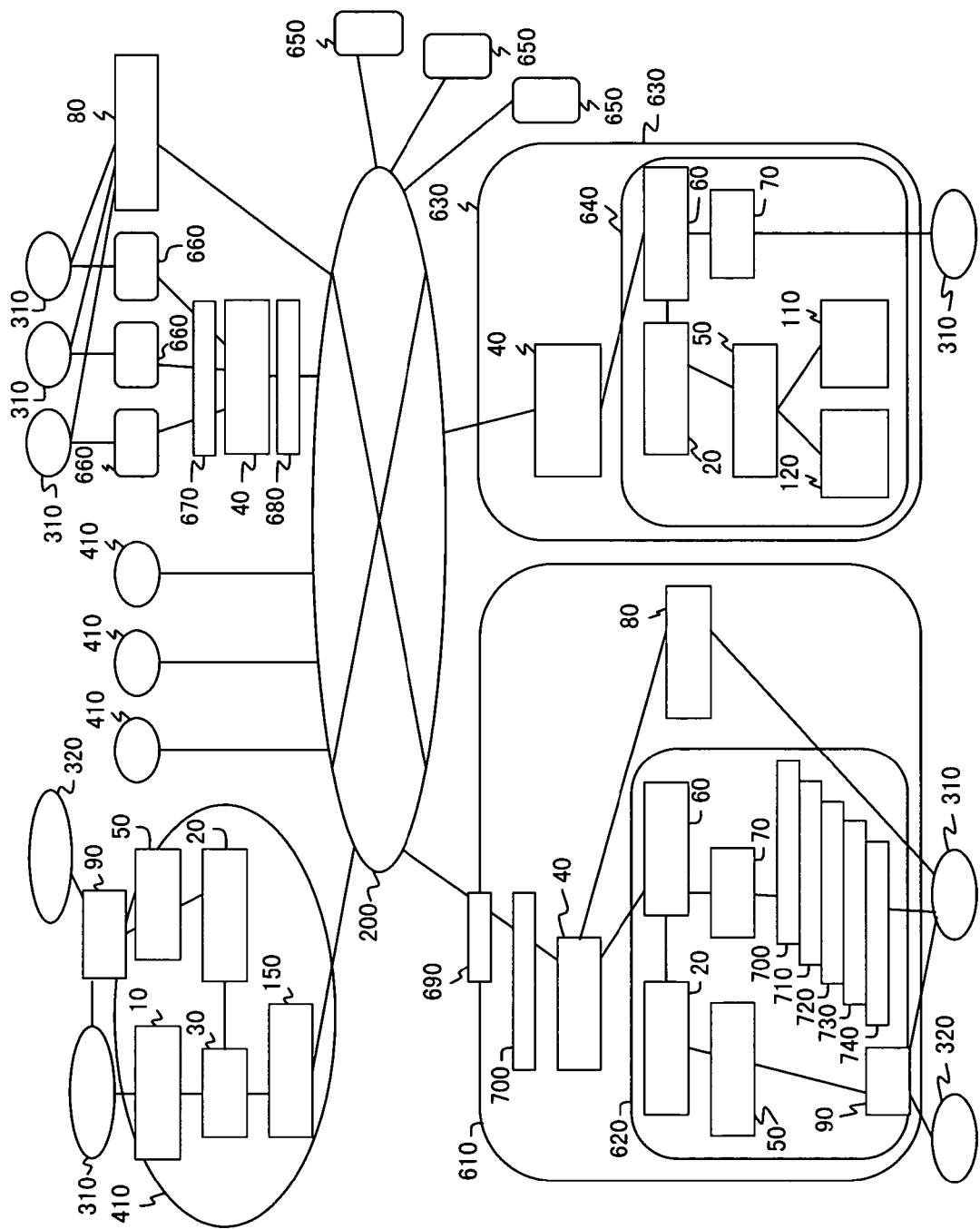
FIG. 14 is a block diagram of the second information system.

Next, we will explain the structure and operation of a global system actualized over the internet, in reference to FIG. 12 to 14.

FIG. 12 is a block diagram of a first information system. The information system in FIG. 12 comprises SI creation device 410, 420, 430, 440, 450, SI collection/provision device 460, SI provision device 480, SI collection unit 40, and SI memory unit 200. SI memory unit 200 corresponds to a memory device such as various severs on the Web and databases, and SI creation device 410, 420, 430, 440, 450, SI collection/provision device 460, and SI provision device 480 correspond to information processing devices such as the terminal device of user 310.

SI creation device 410 comprises information viewing situation monitor 10, current situation assessment unit 20, SI creation unit 30, SI registration unit 150, and sensor 90, as does SI creation device 340 in FIG. 6. Situation transition detection unit 50 is added to SI creation device 420 when necessary.

SI creation device 420 comprises SI creation unit 30 and SI registration unit 150. In this case, SI creation unit 30 creates SI utilizing situations and information resources manually input from user 310.

SI creation device 430 comprises information viewing monitor unit 10, current situation assessment unit 20, SI creation unit 30, SI registration unit 150, schedule management unit 110, and communication unit 95. In this case, current situation assessment unit 20 generates 5W1H situation expression utilizing schedule for user 310 managed by schedule management unit 110 and a part of the situation obtained by communication unit 95 from ubiquitous computer 490.

SI creation device 440 comprises SI creation unit 30, SI refinement unit 35, and SI registration unit 150. In this case, SI creation unit 30 creates SI using situations and information resources manually input from user 310, and SI refinement unit 35 collects a lot of pieces of SI created by SI creation unit 30 and uses these to generate an effective set of SI.

At this time, SI refinement unit 35 compares a plurality of situations where the same information resource was viewed, determines in which situation (same or similar situation) the information resource was viewed most frequently, and creates SI to which the situation is added as a situation condition for this information resource. In this case, the plurality of pieces of SI which had been referred to is integrated into the newly created SI.

FIG. 13 shows an example of a SI refinement process performed by SI refinement unit 35. In this process, the probability 520 of each situation where an information resource is requested is calculated from record 510 of information resource requests in actual situations and SI assembly 530 is generated based on these results. In this case, information resource request record 510 is provided to SI refinement unit 35 as a set of SI of the processing target.

Here, information resource 1 is requested first in situation A, and this fact is recorded as situation-information resource set. In the same way, information resource 2 is requested in situation B, information resource 1 is requested in situation C, information resource 3 is requested in situation A', and information resource n is requested in situation X. Through repeating requests in this way, many situation-information resource sets are collected.

Next, probability 520 of situations where an information resource is requested is calculated for each information resource. Here, out of all situations where information resource 1 was utilized, situation A (or similar situation) and situation C make up 30% and 20%, respectively. Out of all situations where information resource 2 was utilized, situation B and situation D make up 50% and 10%, respectively.

SI is then created for each information resource using the situation which was pulled out the most as the situation condition. For example, in the case of information resource 1, the percentage of instances of utilization in situation A was 30%, the highest probability, and therefore, this situation A is added as the situation condition for information resource 1. In the same way, in the case of information resource 2, situation B is added as the situation condition. Specifications for SI refinement unit 35 are as follows:

Status: Internal module of SI creation unit 30. Utilized when a large number of situation conditions and resources can be collected.
Input: a set of SI
Output: refined SI An agent which learns the method to take appropriate action towards situation which will occur, by recording situation and action combinations, is described in Non-patent Reference 17. This learning algorithm can be applied to SI refinement unit 35.

Non-Paten Reference 17
P. Maes and R. Kozierok, "Learning Interface Agents," Proceedings of the Eleventh National Conference on Artificial Intelligence '93, Washington, D.C., pp. 459-465, MIT Press, July 1993.

SI creation device 450 is comprised of a plurality of SI creation units 30, SI refinement unit 35, and SI registration unit 150. In this case, each SI creation unit 30 creates SI using situations and information resources manually input from user 310, and SI refinement unit 35 generates a set of SI which is shared among a plurality of user 310, using SI created by these SI creation units 30.

In SI creation device 440 and 450, SI is created using situations and information resources manually input from user 310. However, even if SI is created using situations and information resources obtained automatically, SI can be generated for one or plural users 310 using SI refinement unit 35.

SI collection/provision device 460 is provided as a device for personal use by user 310 and comprises SI collection unit 40 and SI provision device 470. SI provision device 470 comprises current situation assessment unit 20, situation matching unit 60, SI provision unit 70, and sensor 90. In this case, current situation assessment unit 20 detects the current situation of user 310 in place of situation transition detection unit 50 in FIG. 9 and sends corresponding situation condition to situation matching unit 60.

SI provision device 480 is provided as a device for personal use by user 310 and is connected to SI memory unit 200 via SI collection unit 40 embedded in a shared device such as a server. SI provision device 480 has the same structure as SI provision device 470, and SI collection unit 40 provides plural SI provision devices 480 with collected SI.

FIG. 14 is a block diagram of a second information system. The information system in FIG. 14 comprises SI creation device 410, SI collection/provision device 610, 630, 650, SI provision device 660, cache 670, 680, SI collection unit 40, feedback unit 80, and SI memory unit 200. SI collection/provision device 610, 630, 650 and SI provision device 660 correspond to information processing devices such as terminal devices.

SI collection/provision device 610 is provided as a device for personal use by user 310 and comprises SI collection unit 40, feedback unit 80, and SI provision device 620. SI provision device 620 comprises current situation assessment unit 20, situation matching unit 60, SI provision unit 70, and sensor 90.

Cache 690 and information filtering unit 700 are added to SI collection/provision device 610 when necessary. Situation transition detection unit 50, information filtering unit 700, interaction level adjustment unit 710, presentation device fitting unit 720, presentation frequency control unit 730, and information volume/timing adjustment unit 740 are added to SI collection/provision device 620 when necessary.

Cache 690 stores SI which SI collection/provision device 460 obtained from SI memory 200. SI which has been utilized once by user 310 can be accessed by using the contents saved locally to cache 690, as long as this SI in the original location has not been updated. In other words, in regards to situations which occur often, SI can be accessed through cache 690, and high-speed access is possible. However, SI regarding situations which once occurred but has since not occurred for a long time is deleted from cache 690.

If the number of pieces of information presented by SI presentation unit 70 is plural, but not very large, SI presentation unit 70 can adjust the presentation information. However, if too many pieces of information fits in situation matching unit 60, information must be selected to some degree beforehand. Therefore, information filtering unit 700 is added to SI collection unit 40 or SI presentation unit 70 and filtering is performed as follows:

information is selected based on user 310 preference and the like (SI is acquired/presented only when specific keywords and metadata are stated).

Only information from reliable information resources are selected (information regarding the information source, authentication information, and the like are utilized).

Interaction level adjustment unit 710 automatically adjusts the type of interaction with user 310 which will be used to show a plurality of pieces of information which fit the current situation. There are a number of levels for interaction for showing a plurality of pieces of information, as is shown below.

(1) A list of information (a title list, for example) is shown, and user 310 selects the information (2) A list of information which has been narrowed down is shown, and user 310 selects the information (3) Information which is considered to be the most appropriate for user 310 is selected and presented to user thereto.

Interaction level adjustment unit 710 adjusts these interaction levels according to user operation and response. As an adjustment method, the technology described in Patent Reference 6 can be implemented, for example.

Patent Reference 6

Japan Patent Application Publication No. 2000-172390, "Automatic level adjustment device, automatic level adjustment method, and program recording media for automatic level adjustment"

Presentation device fitting unit 720 adjusts the information resource presented to user 310 according to the presentation device. For example, even if a plurality of pieces of information is received, if the screen is large or there is a plurality of screens, all information (or a lot of information resources) can be displayed. In contrast, in the case of an ordinary screen, information must be selected (or summarized) and presented.

In addition, information resource media can also be selected. For example, in a scene where only a mobile phone can be used, it can be adjusted to present only text parts or speech parts out of the information within the information resource.

Presentation device fitting unit 720, for example, receives information regarding the capabilities of a presentation device which can currently be used, selects appropriate information according to a correspondence table of presentation device capability and presentation information, and presents this information to user 310. An example of information regarding presentation device is as follows:

Screen size: 600*480
Resolution: 600 dots per 25.4 mm
Audio output: available

Specifications for CC/PP can also be used as description definition, communication method, and the like, regarding capabilities of a presentation device. Specifications for presentation fitting unit 720 are as follows:

Status: activated if information resource must be adjusted to device display capabilities and the like when being output
Input: information regarding presentation device capabilities
Output: information resource customized for a device Presentation frequency control unit 730 oversees the actual presentation frequency in adherence to attributes which specify the presentation frequency of the information, and executes control according to this presentation frequency. In this way, presentation method of information can be controlled according to frequency appropriate for the situation condition of SI and the current situation.

For example, of the presentation frequency is specified as "1", although information is presented when the information fits the presentation condition (situation condition) for the first time, this information is not presented when fits the presentation condition for the second time onward. Furthermore, if "any-time" is specified as the presentation frequency, information is presented any time the information fits the presentation situation. Presentation frequency is set as a SI control parameter (times) as is shown below:

```
<SituatedInformation>
    <control>
        <times> 3 </times>
    </control>
    <situation>
        <who>
            <affiliation> insider </affiliation>
        </who>
        <where> in front of copier</where>
    <situation>
    <info title="copier use code number">
        <text> 44367 </text>
    </info>
</SituatedInformation>
```

When there is SI such as this, presentation frequency control unit 730 presents the code number "44367" for the first three times a person inside the organization stands in front of the copier, but executes a control wherein the code number is not presented subsequently, even if a person inside the organization stands in front of the copier.

Information volume/timing adjustment unit 740 adjusts the volume of information and presentation timing, according to the volume of information user 310 can view and the task which is currently being performed, and presents the information. Technology described in Patent Reference 7 can be used as adjustment method, for example.

Patent Reference 7

Japan Patent Application Publication No. 2000-99441, "Information presentation device and method for presenting adjusted information"

SI collection/provision device 630 is provided as a device for personal use by user 310 and comprises SI collection unit 40 and SI provision device 640. SI provision device 640 comprises current situation assessment unit 20, situation matching unit 60, SI presentation unit 70, and situation transition prediction unit 100. Schedule management unit 110 and routine work detection unit 120 is added to SI collection/provision device 640 when necessary.

SI collection/provision device 650 corresponds to SI collection/provision device 610 and 630, described above.

SI provision device 660 is provided as a device for personal use by user 310 and is connected to SI memory unit 200 via SI collection unit 40 embedded in a shared device such as a server. SI provision device 660 has the same structure as SI provision device 620, and SI collection unit 40 provides collected SI to plural SI provision devices 660. In addition, feedback unit 80 feed backs responses from a plurality of users 310 to SI collection unit 40 and SI memory unit 200.

A server comprising cache 670 is added between SI provision device 660 and SI collection device 40 when necessary, and a server comprising cache 680 is added between SI provision device 660 and SI memory device 200 when necessary.

By providing cache servers to a plurality of layers in this way, it is possible to speed up access to SI within a community of plurality of users 310 utilizing similar information in similar situations.

Next, we will explain the process flow in the information system shown in FIG. 12 and FIG. 14, in reference to FIG. 15 to 25.

FIG. 15 is a flowchart showing an overview of the entire process. Information system first creates SI (Step S31) and registers the SI to SI memory unit 200 (Step S32). Next, the system collects SI (Step S33), presents it to user 310 (Step S34), detects user response (Step S35), and modifies SI accordingly (Step S36).

Figure 16:
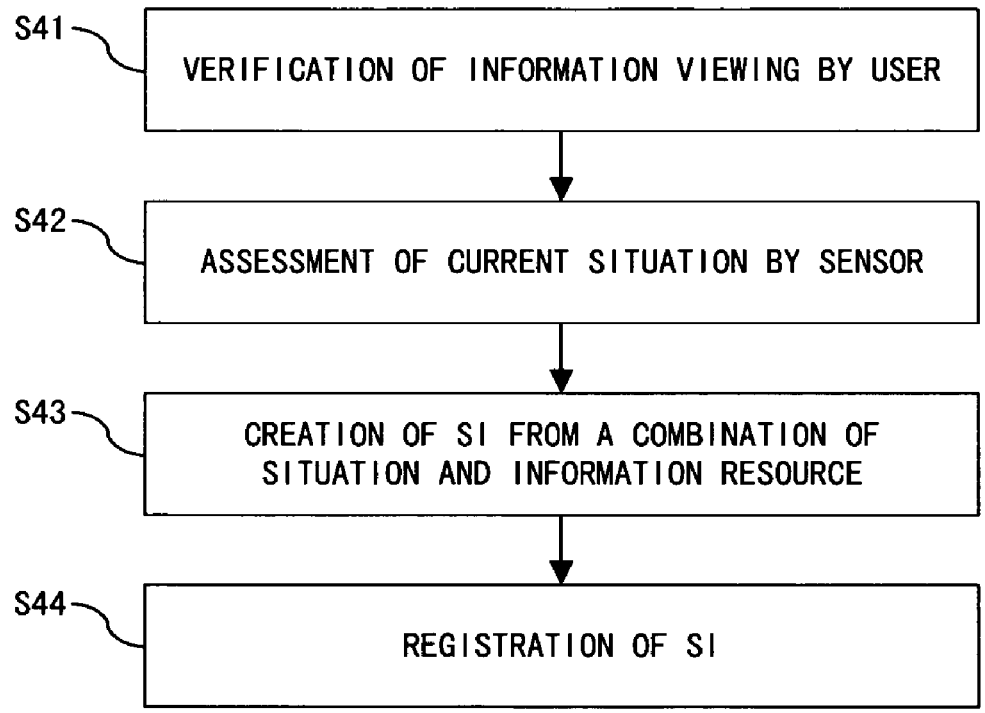
FIG. 16 is a flow chart of the first SI creation process.

FIG. 16 is a flowchart of a SI creation process performed by SI creation device 410 in FIG. 12. After information viewing situation monitor 10 acknowledges information viewing by the user (Step S41), current situation assessment unit 20 (or situation transition detection unit 50) obtains current situation from sensor 90, and SI creation unit 30 creates SI from a combination of the obtained situation and information resource being viewed. Then, SI registration unit 150 registers the created SI to SI memory unit 200 (Step S44).

Figure 17:
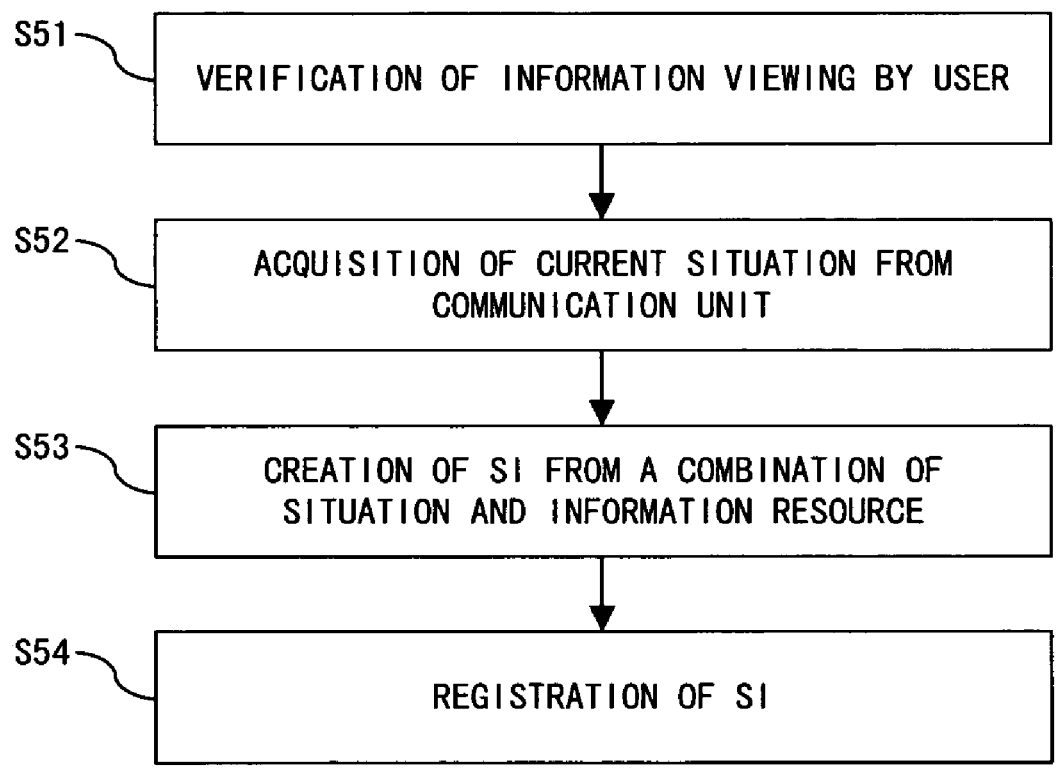
FIG. 17 is a flow chart of the second SI creation process.

FIG. 17 is a flowchart of SI creation process performed by SI creation device 430 in FIG. 12. The processes for Steps S51, S53, and S54 in FIG. 17 are the same as the processes for Steps S41, S43, and S44 in FIG. 16. In Step S52, current situation assessment unit 20 obtains current situation from communication unit 95 and sends this to SI creation unit 30.

FIG. 18 is a flowchart of another SI creation process performed by SI creation device 430. The processes for Steps S61, S63, and S64 in FIG. 18 are the same as the processes for Steps S41, S43, and S44 in FIG. 16. In Step S62, current situation assessment unit 20 infers current situation from a schedule managed by schedule management unit 110 and send this to SI creation unit 30.

Figure 19:
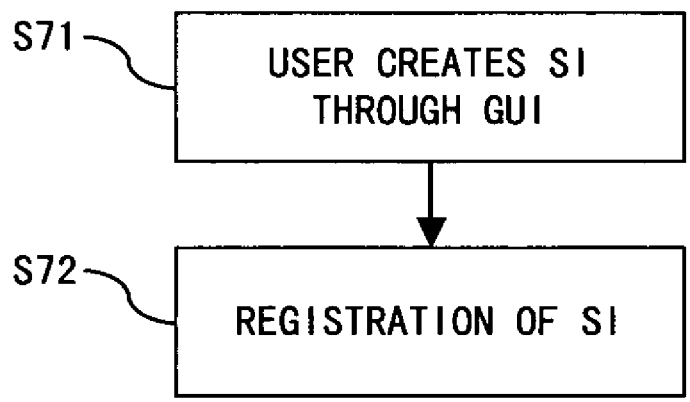
FIG. 19 is a flow chart of the fourth SI creation process.

FIG. 19 is a flowchart of a SI creation process performed by SI creation device 420 in FIG. 12. The process for Step S72 in FIG. 19 is the same as the process for Step S44 in FIG. 16. In Step S71, SI creation unit 30 creates SI using current situation which user 310 inputs by GUI (graphical user interface).

FIG. 20 is a flowchart of a SI creation process when SI refinement unit 35 is added to SI creation device 430 in FIG. 12. The processes for Steps S81 to S83 in FIG. 20 are the same as the processes for Steps S51 to S53 in FIG. 17. By repeating the processes in Steps S81 through S83, a plurality of pieces of SI are created. Then, in Step S84, SI refinement unit 35 creates a refined set of SI from the created pieces of SI, and sends this set to SI registration unit 150.

Figure 21:
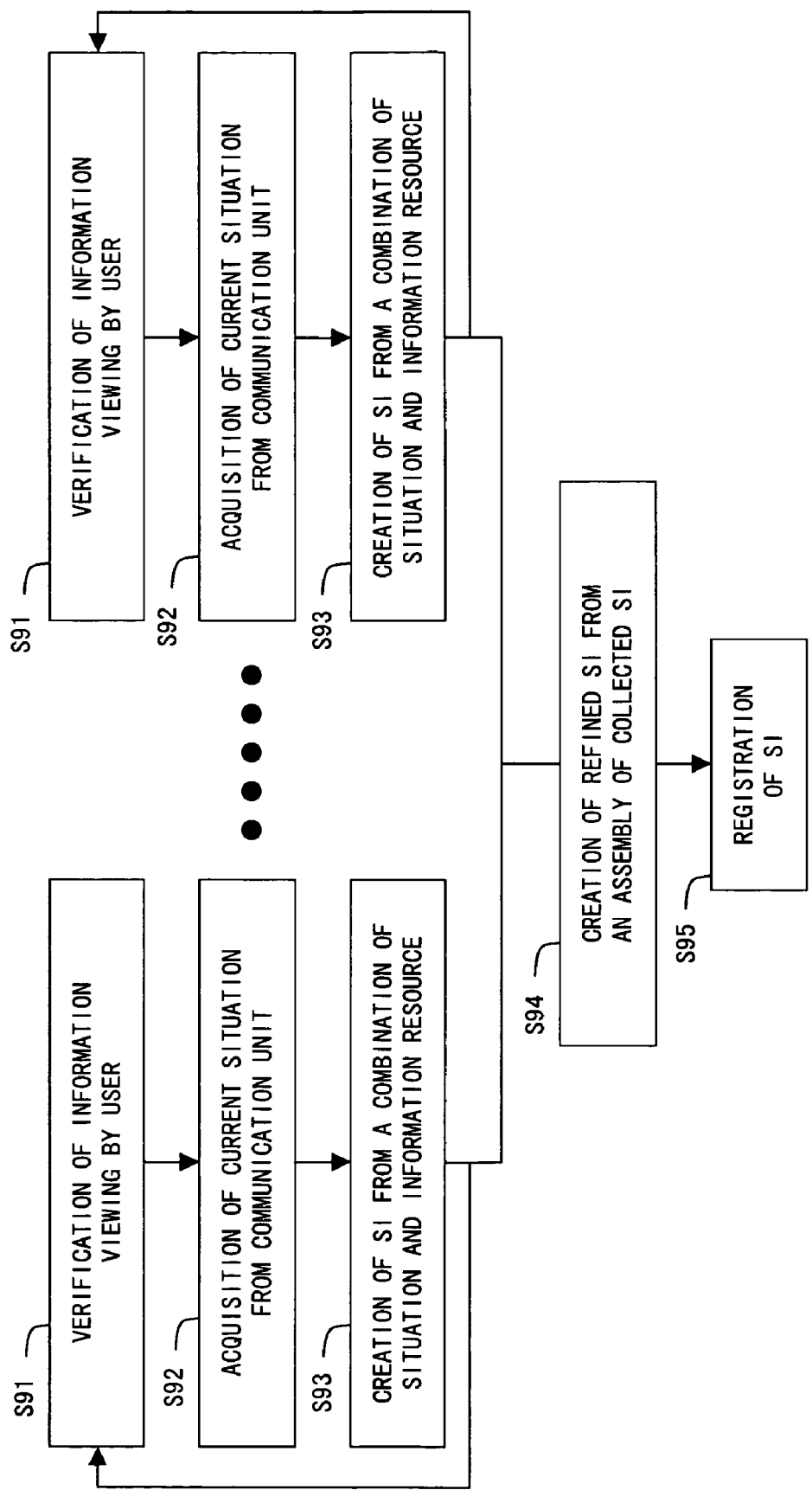
FIG. 21 is a flow chart of the sixth SI creation process.

FIG. 21 is a flowchart of a SI creation process when N pieces of SI creation devices each comprising information viewing monitor 10, current situation assessment unit 20, SI creation unit 30, and communication unit 95 are provided. In this case, these SI creation devices are connected to SI memory unit 200 via SI refinement unit 35 and SI registration unit 150 embedded in a shared device such as a server.

The processes for Steps S91 to S53 in FIG. 21 are the same as the processes for Steps S81 to S83 FIG. 20, and are performed separately for each of the N users. Then, a shared SI refinement unit 35 creates a refined set of SI from SI collected from a plurality of SI creation devices (Step S94), and a shared SI registration unit 150 registers the created set of SI to SI memory unit 200 (Step S95).

Figure 22:
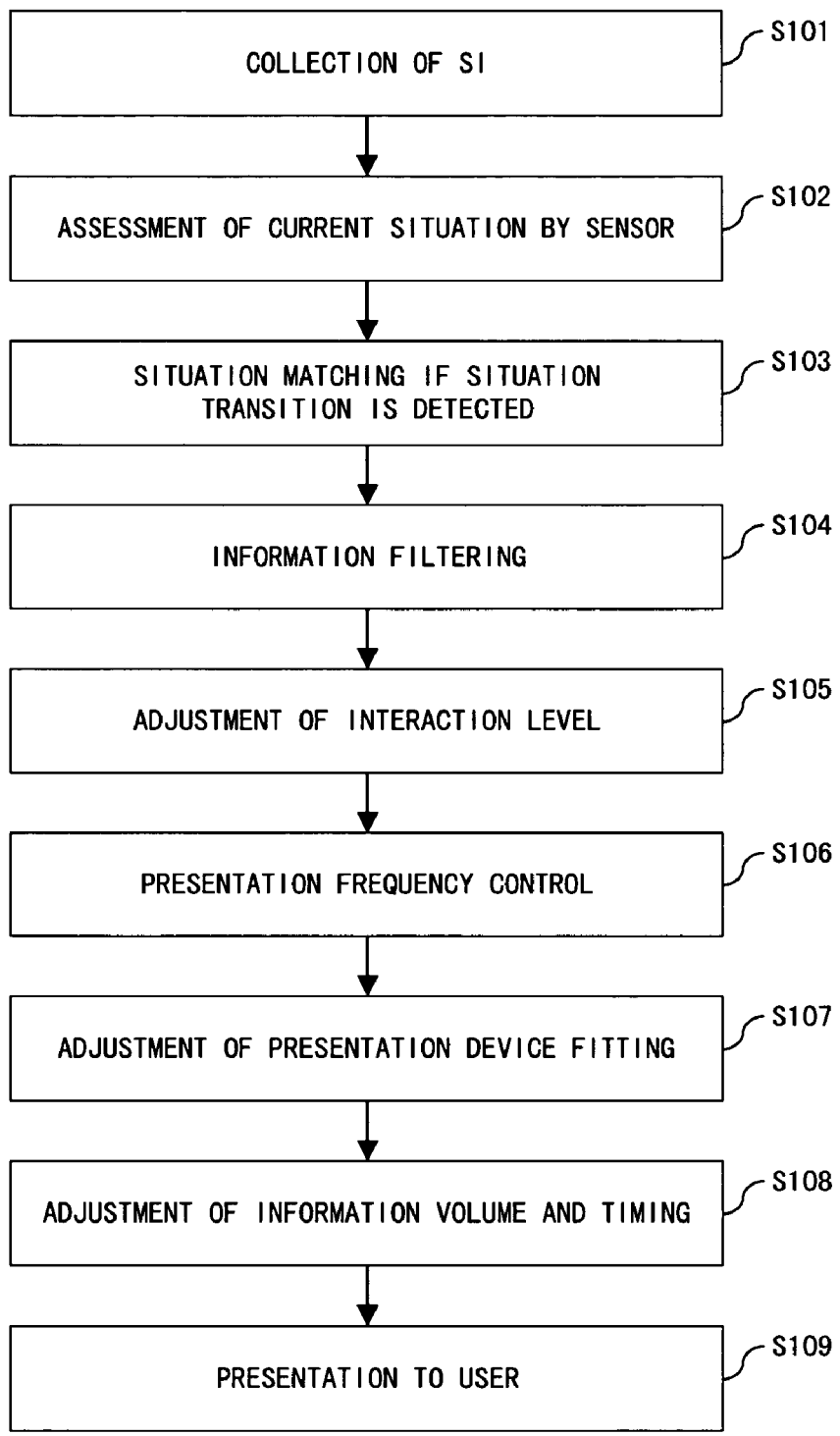
FIG. 22 is a flow chart of an SI collection/provision process.

FIG. 22 is a flowchart of SI collection/provision process performed by SI collection/provision device 610 in FIG. 14. First, SI collection unit 40 collects SI from SI memory unit 200 (Step S101), and situation transition detection unit 50 obtains current situation from sensor 90 (Step S102). If situation transition detection unit 50 detects a situation transition, situation matching unit 60 performs a matching process and sends SI fitting the current situation to SI presentation unit 70.

Next, information filtering unit 700 performs information filtering (Step S104), interaction level adjustment unit 710 adjusts interaction level (Step S105), and presentation frequency control unit 730 performs control according to the specified presentation frequency (Step S106). In addition, presentation device fitting unit 720 selects information according to the capabilities of the presentation device, and information volume/timing adjustment unit 740 adjusts information volume and presentation timing (Step S108). Then, SI presentation unit 70 presents the adjusted information to user 310 (Step S109).

The sequence of Steps S104 to 108 can be interchanged at will.

Figure 23:
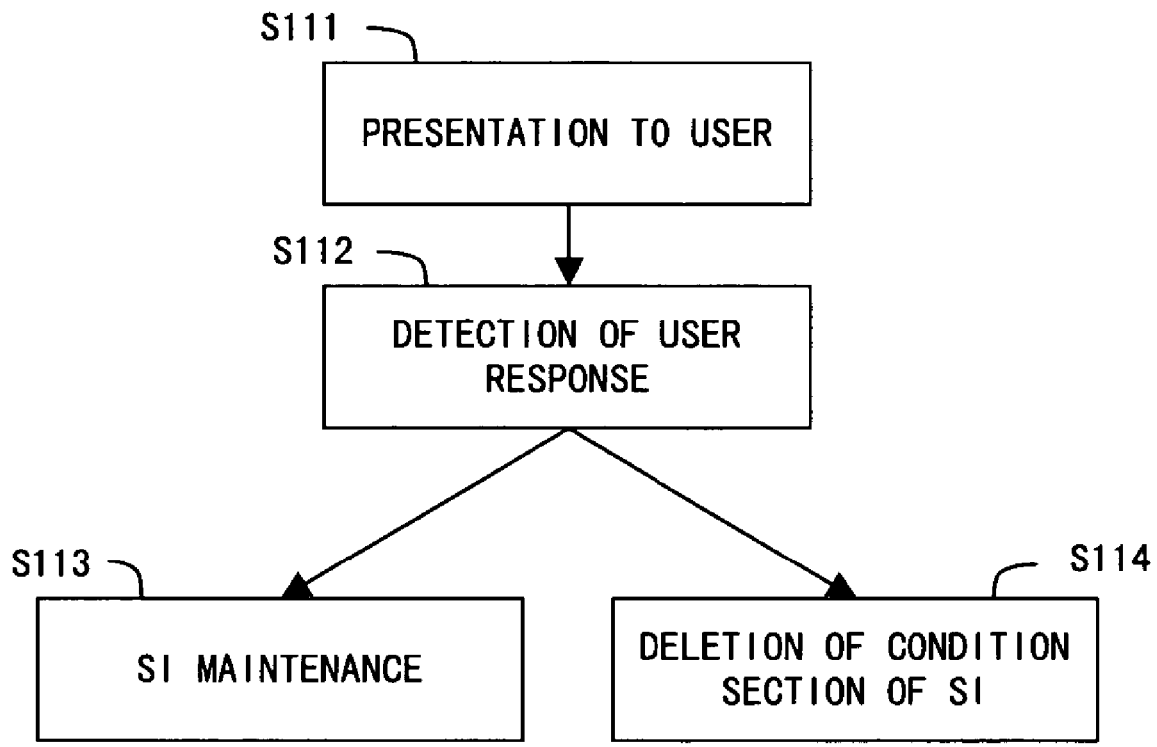
FIG. 23 is a flow chart of the first SI maintenance process.

FIG. 23 is a flowchart of an SI maintenance process performed by SI collection/provision device 610. After the SI presentation unit 70 presents information to user 310, feedback unit 80 detects response from user 310 (Step S111). If the response is positive, the presented SI is maintained (Step S113) and if the response is negative, the situation condition of the presented SI is deleted (Step S114).

Figure 24:
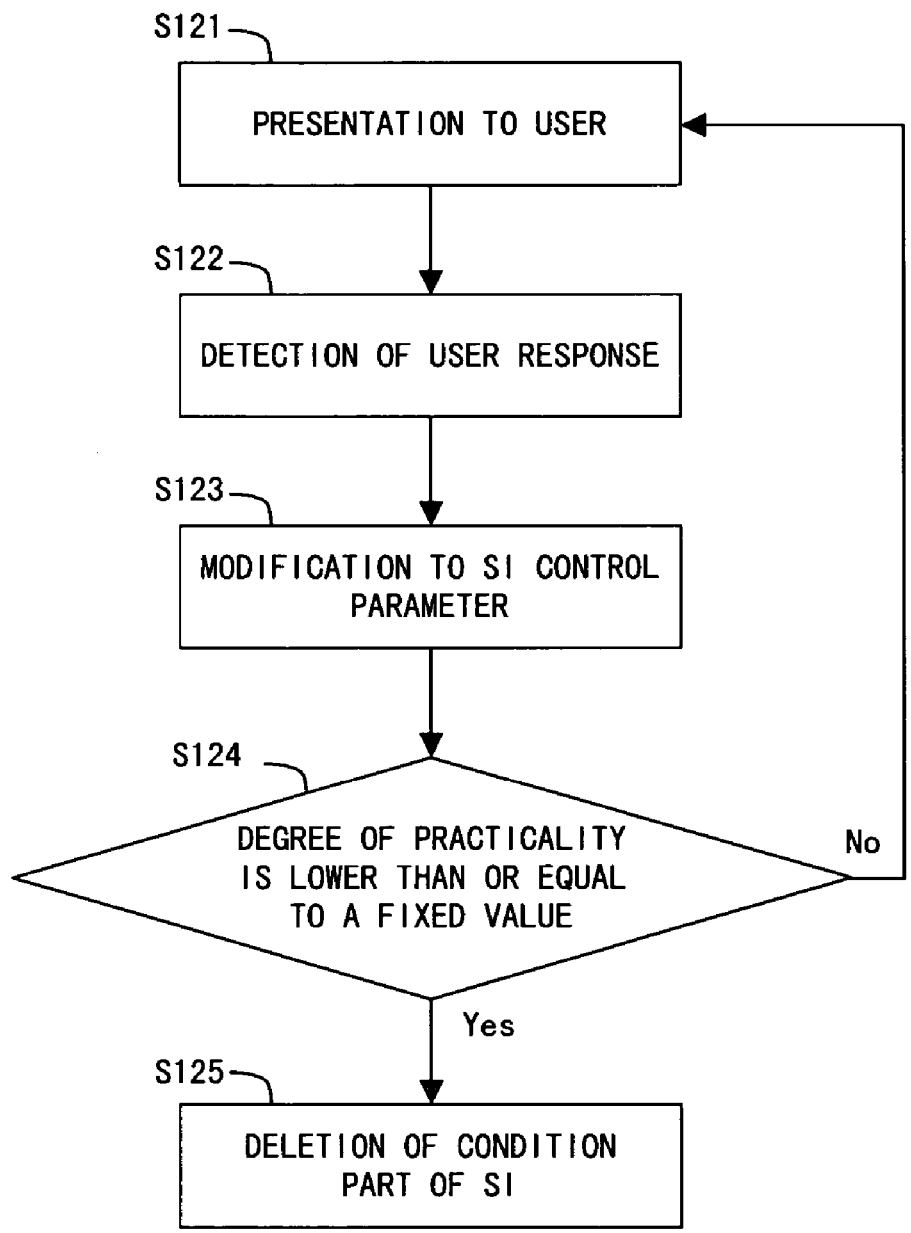
FIG. 24 is a flow chart of the second SI maintenance process.

FIG. 24 is a flowchart of another SI maintenance process performed by SI collection/provision device 610. In this process, practicality parameter, described above, is used. The processes for Steps S121 and S122 in FIG. 24 are the same as the processes for Steps S111 and S112 FIG. 23.

Feedback unit 80 increments the practicality parameter if user response is positive and decrements if user response is negative (Step S123). Next, feedback unit 80 compares the practicality parameter with a fixed value (for example, −10) (Step S124). If the practicality parameter is larger than the fixed value, SI collection/provision device 610 repeats the processes subsequent to Step S121. If the practicality parameter is smaller than or equal to the fixed value, feedback unit 80 deletes the situation conditions of the presented SI (Step S125).

Figure 25:
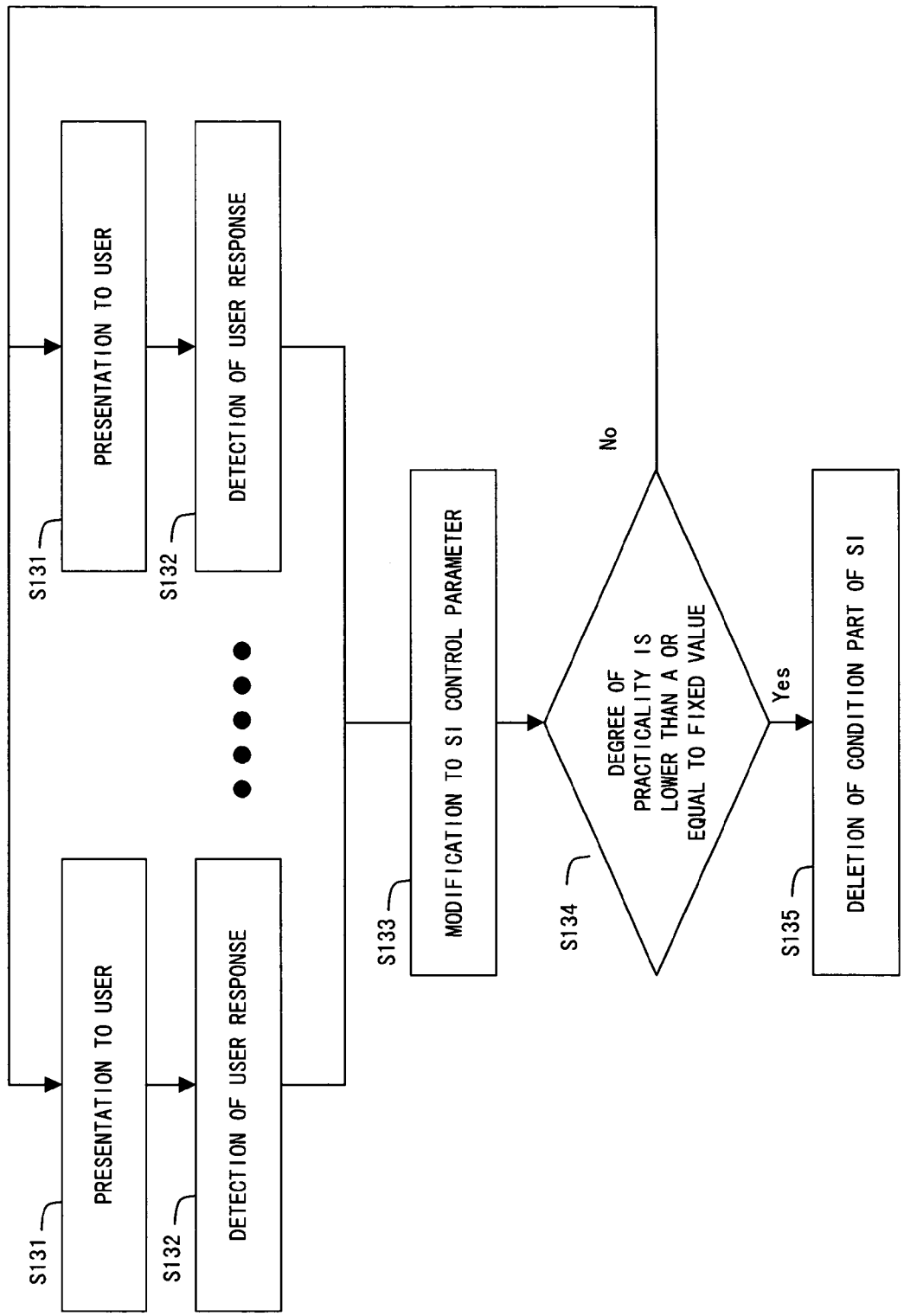
FIG. 25 is a flow chart of the third SI maintenance process.

FIG. 25 is a flowchart of an SI maintenance process which is performed by SI provision device 660 and feedback unit 80 in FIG. 14. Here, SI provision device 660 should be provided separately for each of the N users 310. The processes for Steps S131 and S132 in FIG. 25 are the same as the processes for Steps S121 and S122 FIG. 24, and are performed separately for each of the N users 310.

Feedback unit 80 increments the practicality parameter of SI separately for each of the N users 310 if response is positive, and decrements the parameter if response is negative (Step S133). The processes for the subsequent Steps S134 and S135 are the same as the processes for Steps S124 to S125 in FIG. 24.

Next, we will describe specific examples for (1) to (3), as utilization method for the information system explained above.

(1) P2P (Peer to Peer)

(a) Global System

Let us say, for example, when Person A, who is a visitor not affiliated to X University, enters the campus of X University, he acquires a campus map of X University from the Web and displays it, using his PDA (Personal Digital Assistance). At this time, the following SI is created by SI creation unit 30 and stored as a file to SI memory unit 200 (directory in the Web server) by SI registration unit 150.

```
<SituatedInformation>
   <situation>
      <who>
         <affiliation> visitor </affiliation>
      </who>
      <where> on-campus of X university </where>
   </situation>
   <info>
      <image src=
      "uri://X-University.edu/campus-map.jpg"/>
   </info>
</SituatedInformation>
```

The personal agent of another visitor, Person B, regularly collects large amounts of SI which may be relevant to Person B utilizing SI collection unit 40. After situation transition detection unit 50 in the PDA carried by Person B detects the fact that Person B has entered the campus of X University, situation matching unit 60 finds SI suitable for the current situation from SI collected by the personal agent. By doing so, SI of the campus map above is found and, and the campus map is displayed automatically.

(b) Local System (Request to Other Persons)

If a presenter wants materials which are being currently being presented during a meeting, the following text between <text> tags will automatically be displayed in the terminal of this presenter after the meeting, if information such as the following is sent over the Web:

```
<situation>
   <who> current presenter</who>
   <when> after meeting</when>
</situation>
   <info>
      <text> Please send materials used in today's meeting to
         me. </text>
   </info>
```

(2) Service Provided According to Situation (B2E: Business to Employee, G2C: Government to Customer, I2S: Institute to Student)

The information provider (creator) provides information attached with situation metadata, and the user utilizes this information according to the situation. Information provider creates SI by adding situation conditions, which indicate scenes wherein the information can be used, to the information resource the provider wants to provide. Then, the provider releases it on a Web Server and the like, and provides service.

For example, if an earthquake occurs while a BB town resident is at home, an SI-capable television acknowledges the tremors, extracts SI such as the following automatically, and presents this resident with information regarding evacuation shelters.

```
<SituatedInformation>
   <situation>
      <where>
         <address> BB town </address>
         <surrounding-condition> earthquake
         </surrounding-condition>
      </where>
   </situation>
   <info title="zone evacuation shelter">
```

-continued
```
      <text> Your evacuation shelter is CC Park </text>
      <image src="map_to_cc_park.jpg"> </image>
   </info>
</SituatedInformation>
```

(3) M2M (Myself to Myself)

There are times when, although one had seen (read) information once before, one cannot remember where he or she saw (read) it when it is needed. Therefore, by adding situation conditions, which indicate situations where the information will be effective for a person, to the information the person read and saving it, the information can be extracted automatically when the situation occurs. For example, if information regarding road construction is seen once, situation conditions such as the following are added and saved.

```
<situation>
   <where> national road 1 between DD and EE   </where>
</situation>
<situation>
   <what>
      <task> route planning </task>
   </what>
</situation>
<info>
   <text> road construction information </text>
</info>
```

When there are two <situation> as in the SI above, this indicates that the information of <info> is effective in each of these situations. The user can see the information regarding road construction the next time a situation where the user is near this road, or a situation where route planning task is performed (becomes more effective when the planning result comprises the location of construction), occurs.

Even with information seen in paper documents and releases, if this information is considered to be effective in a specific situation, it will be convenient when searching for the information later, if it is attached with situation conditions and saved. In this case, SI such as that below is created.

```
<situation>
   <what>
      <task> building web system </task>
   </what>
</situation>
<info>
   <text source="The Japanese Society for Artificial
      Intelligence Journal, Vol.16, No.4, 2001/07,
      pp.494-534"> Special feature: Information
      Acquisition Support Technology in Web Systems
   </text>
</info>
```

In addition, a small memory (for example, IC (integrated circuit) memory) can be pasted onto paper media and the like, and URI and situation metadata can be stored into this memory. In this case, SI such as that below is created, for example.

```
<situation>
   <what>
      <task> building web system </task>
```

-continued

```
    </what>
</situation>
<info>
    <uri> paper://jsai/Vol.16/No.4/2001/07/pp.494-534
    </uri>
</info>
```

Furthermore, if you wish to speak about a certain topic when you meet Person A, SI such as that below can be created.

```
<situation>
    <what> Person A</what>
</situation>
<info>
    <text> memo regarding the content of your speech
    </text>
</info>
```

As described in the foregoing, the who element indicates the person using the information, and the person targeted by the actions of the person using the information is indicated by the what element. Therefore, here, Person A, who is the target of the action, is described using <what>.

SI creation device 340 in FIG. 6, SI provision device 350 in FIG. 7, SI creation device 410, 420, 430, 440, 450, SI collection/provision device 460 and SI provision device 480 in FIG. 12, SI collection/provision device 610, 630, 650, and SI provision device 660 in FIG. 14, and other servers (Web server, cache server, etc.) are organized using, for example, an information processing device (computer) such as that shown in FIG. 26.

The information processing device in FIG. 26 comprises CPU (central processing unit) 810, memory 820, input device 830, output device 840, external storage device 850, medium driving device 860, and network connecting device 870, which are interconnected by bus 880.

Memory 820 comprises, for example, ROM (read only memory) and RAM (random access memory) and stores programs and data utilized for processing. CPU 810 performs necessary processing by executing a program using memory 820.

Information viewing situation monitor unit 10, current situation assessment unit 20, SI creation unit 30, SI collection unit 40, situation transition detection unit 50, situation matching unit 60, SI presentation unit 70, feedback unit 80, situation transition prediction unit 100, SI registration unit 150, schedule management unit 110, routine work detection unit 120, predicted information collection unit 130, SI refinement unit 35, information filtering unit 700, interaction level adjustment unit 710, presentation device fitting unit 720, presentation frequency control unit 730, and information volume/timing adjustment unit 740 correspond to the program stored in Memory 820.

Input device 830 is, for example, a keyboard, pointing device, touch panel, and the like, and is utilized to input instructions and information from the user. Output device 840 is, for example, a display device, printer, speaker, and the like, and is utilized to output inquiries to users and presentation information.

External storage device 850 is, for example, magnetic disk device, optical disk device, magneto-optical disk device, tape device, and the like. Information processing device saves the afore-mentioned program and data to this external storage device 850, and loads the program and data to memory 820 and utilizes them when necessary.

Medium driving device 860 drives portable recording medium 890 and accesses the recorded contents. An arbitrary computer-readable recording medium such as memory cards, flexible disks, CD-ROM (compact disk read only memory), optical disks, magneto-optical disks and the like are utilized as portable recording medium 890. The user stores the afore-mentioned programs and data to this portable recording medium 890 and makes the programs and data loaded to memory 820 and utilizes them when necessary.

Network connecting device 870 is connected to a arbitrary communication network such as LAN (local area network) and the internet and performs data conversion accompanying communication. The information processing device receives the afore-mentioned programs and data from other devices, via network connection device 870, and loads the programs and data to memory 820 and utilizes them when necessary.

FIG. 27 shows computer-readable recording media which can provide programs and data to the information processing device in FIG. 26. Program and data stored in portable recording medium 890 and database 910 in server 900 are loaded to memory 820. At this time, server 900 generates a propagation signal which propagates the program and data, and sends the signal to the information processing device via an arbitrary transmission medium in the network. Then CPU 810 executes this program and performs necessary processing.

Next, we list specific examples for proving the hypothesis, "all information has an appropriate situation where it should be utilized." For example, information such as that shown in (1) and (2), below, are considered to be effective in the situations given.

(1) Home
Information: information on a certain restaurant
Situation: where=near the restaurant, when=mealtimes
Information: information on gasoline stations (location, price)
Situation: where=near the gasoline station, when=running out of gasoline
Information: emergency hospital
Situation: when=weekends (when regular hospitals are closed), what=sick child
Information: refrigerator contents and their expiration dates
Situation 1: when=deciding dinner meals, who=housewives
Situation 2: where=supermarket, what (task)=shopping
Information: bill and receipt contents
Situation: what (task)=keeping account book
Information: information on tourist spots (remote location)
Situation: what (task)=form travel plans, when=long-term holiday
Information: information on tourist spots (events) (nearby location)
Situation 1: what (task)=form travel plans, when=weekend, who (property)=family structure (two children), financial situation
Situation 2: why=please parents (grandchildren), when=parents (grandchildren) arrive
Situation 3: where (surrounding-condition)=good weather, when=weekend, holiday (day off from work and school)
Information: tax-related information
Situation: when=filing income tax return
Information: clothing-related advertisement
Situation 1: why (motivation)=want to look beautiful for dates and parties
Information: bank balance
Situation: what (task)=making a large payment
Information: information on newly built condominiums
Situation: where=nearby location (within commuting range), who (property)=family structure (two children), financial situation (over five million yen in annual income)

Information: university campus map
Situation: when=entering university campus, who=persons not students or employees of the university
Information: life-style-related information
Situation: what (task)=living in Osaka due to job transfer
Information: timetable (bus, train)
Situation 1: where=home, place of employment, when=before leaving
Situation 2: what (task)=forming business trip plans or vacation plans
Information: weather
Situation 1: where=home, place of employment, when=plans for going out tomorrow (day before)
Situation 2: what (task)=forming business trip plans or vacation plans
Information: phone number of plumbing company
Situation: what=water leak
Information: phone number of JAF (registered trademark) (Japan Automobile Federation)
Situation: what=car breakdown
Information: relaxing music
Situation: why (emotion)=tense
Information: VCR (video cassette recorder) set-up manual
Situation: where=in front of the VCR, what=VCR, what (task)=setting up the clock
Information: list of addresses
Situation: what (task)=writing a letter
Information: list of phone numbers
Situation: where=in front of the phone (facing the phone)
Information: "to do" list
Situation: where=in front of the desk (sitting at the desk), when=9:00 (start of working hours)
Information: evacuation shelter
Situation: where=home, where (physical-surroundings)=detects disasters such as earthquakes and fires (2) Business
Information: industry news updates
Situation: who=affiliated industry, what (task)=technological trend report
Information: bill and receipt contents
Situation: when=settlement of accounts (20th)
Information: tool information
Situation 1: what (task)=programming
Situation 2: what (task)=creating documents
Information: daily schedule
Situation: when=arriving at work in the morning
Information: Help information
Situation: what=software in use freezes
Information: location of guest
Situation: when=time meeting starts (displays the location of the guest if the guest does not show up by the time meeting starts)
Information: current budget situation
Situation: what=submitting purchase request
Information: information on computers which can currently be used
Situation: what=submitting purchase request
Information: directions for using a device
Situation: where=in front of the device
Information: corporate data
Situation: where=client' office Although the embodiments described above are mainly cases where a person (user) utilizes information resources according to that person's situation, cases where an object utilizes information resources according to its situation are also possible.

For example, an information provision device, such as an electronic signboard on the street and the like, which provides information to users (a ubiquitous computer which is embedded into an environment) utilizes information resources as information source. In this case, the information provision device regularly downloads SI fitting the situation of the device (SI corresponding to the role or location of the information provision device) from the internet and utilizes it for providing a service to a user utilizing the device.

Ubiquitous computers and information provision device such as these are constructed using the information processing device shown in FIG. 26, for example.

According to the present invention, effects such as (1) and (2) below can be expected.

(1) Enhancement of Information User Convenience

When obtaining information by keyword searches or category selections, it is difficult to acquire necessary information unless the user has a degree of knowledge of the field the information belongs to. In regards to this, if SI of the present invention is utilized, information which is given in other fields can be extracted in adherence to the current situation.

(2) Increased Information Viewing Rates and Service Induction Rates

Information providers (creators, transmitters) can expect not only increase in viewers on the provided information, but also an increase in usage of the information. For example, if the information is regarding service provision, an increase in users of this service can be expected.

Furthermore, the present invention can be applied to fields such as (1) and (2) below:

(1) Service
  Service provision from government groups to residents (G2C)
  Service provision from corporations to clients (B2C: Business to Consumer)
  Service provision for employees (B2E)
  Inter-corporation information exchange (B2B: Business to Business)
  Personal level information exchange (P2P)
  Knowledge sharing support for knowledge workers (E2E: Engineer to Engineer)
  Own information management (M2M)
  Service provision for students in educational institutions such as universities (I2S)
  Tourist information service (2) Appliance
  As seen below, any object which has a function of presenting information, such as text, audio, and graphics, can be a device for providing information adhering to situation.
  SI-capable television
  SI-capable PDA
  SI-capable wristwatch
  SI-capable mobile phone
  SI-capable electronic bulletin board
  SI-capable eyeglasses (head-mount display)
  SI-capable car navigation system
  SI-capable glass (house and car windows, shop windows, and the like become information bulletin boards)

If the functions of SI are realized in micro-modules, it would be possible to embed this function within anything (doors, walls, ceilings, traffic lights, traffic signs, vending machines, crosswalks, etc.) in the homes and cities.

Of course, application to current personal computers is also possible. Web browsers and (active) desktops can be used with SI functions embedded in them. It can be applied to mailers as well. In this case, instead of sending to person A an e-mail by specifying the regular e-mail address, it can be sent by creating information such as that below:

```
<situation>
    <who> person A </who>
</situation>
<info>
    <text> e-mail content </text>
(Other multi-media information can be attached as well)
</info>
```

A convenient point is that, by specifying a situation such as that below, e-mails can be sent to persons belonging to FF Company without managing a mailing list.

```
<situation>
    <who>
        <affiliation> FF </affiliation>
    </who>
</situation>
```

Furthermore, by specifying information such as that below, e-mails can be sent to persons who are currently in GG Building.

```
<situation>
    <when> now </when>
    <where> GG Building </where>
</situation>
```

Messages to persons currently inside this building are unnecessary for persons currently outside the building. Therefore, by sending e-mails according to a mailing list of persons regularly using this building, there is a possibility that e-mails have been sent to persons who do not need this message. However, by specifying situations such as that above, e-mail can be sent only to persons inside the building.

Other than this, e-mail geared for a plurality of persons in a certain situation can be sent without registering a mailing list. Since mailing lists are not real-time information, e-mail may be sent to persons with whom there is now no relationship. In addition, managing mailing lists can become cumbersome. However, if e-mail is created using SI, e-mail can be sent to persons profiled real-time, and mailing list management becomes unnecessary.

What is claimed is:

1. A computerized information provision device comprising:
   a detection unit for detecting information which specifies at least one of an entity, a target of an action of the entity, a spatial situation where the entity is laid, a current temporal situation, an objection of the entity, a motivation of the entity, and a method for actualizing the action of the entity as a current situation of the entity;
   a creation unit for creating situated information by adding detected situation information to a utilized information resource at the detected situation;
   a physical memory unit for storing the created situated information;
   a matching unit for matching the situation information included in the created situated information and the current situation detected by the detection unit; and
   a presentation unit for presenting an information resource to which situation information fitting the current situation is added.

2. The information provision device of claim 1 further comprising:
   a prediction unit for predicting transition in a situation of the entity;
   a matching unit for matching the situation information included in the stored situated information and the predicted-situation; and
   a presentation unit for presenting an information resource to which situation information fitting the predicted situation is added.

3. The information creation device of claim 1 further comprising:
   a monitor unit for monitoring an information resource which is utilized by entity utilizing the information resource; wherein
   the creation unit creates situated information by adding the detected situation information to the utilized information resource observed by the monitoring unit.

4. An information provision device placed in an environment, and accessible to at least one memory unit stored situated information through the internet, wherein the situated information is created by adding situation information to an information resource utilized at a situation, wherein the situation information is detected of which specifies at least one of an entity, a target of an action of the entity, a spatial situation where the entity is laid, a current temporal situation, an objection of the entity, a motivation of the entity, and a method for actualizing the action of the entity as a current situation of the entity, comprising:
   a download unit for downloading the situated information which corresponds to a location of the information provision device from at least one of the memory unit; and
   a physical presentation unit for presenting a service to a user utilizing the information provision device using the downloaded situated information.

5. An information provision method, comprising:
   detecting information which specifies at least one of an entity, a target of an action of the entity, a spatial situation where the entity is laid, a current temporal situation, an objection of the entity, a motivation of the entity, and a method for actualizing the action of the entity as a current situation of the entity;
   creating situated information by adding detected situation information to a utilized information resource at the detected situation;
   storing the created situated information in a physical memory device;
   matching the situation information included in the created situated information and the current situation detected by the detection; and
   presenting on a display an information resource to which situation information fitting the current situation is added.

6. The information provision method of claim 5 further comprising:
   predicting transition in a situation of the entity;
   matching the situation information included in the stored situated information and the predicted situation; and
   presenting an information resource to which situation information fitting the predicted situation is added.

7. The information creation method of claim 5 further comprising:
   monitoring an information resource which is viewed by an entity utilizing the information resource; wherein
   the creating creates situated information by adding the detected situation information to the utilized information resource observed by the monitoring.

8. A computer-readable recording medium wherein a program for a computer is recorded, the program causing the computer to perform:
- detecting information which specifies at least one of an entity, a target of an action of the entity, a spatial situation where the entity is laid, a current temporal situation, an objection of the entity, a motivation of the entity, and a method for actualizing the action of the entity as a current situation of the entity;
- creating situated information by adding detected situation information to a utilized information resource at the detected situation;
- storing the created situated information;
- matching the situation information included in the created situated information and the current situation detected by the detection; and
- presenting an information resource to which situation information fitting the current situation is added.

9. The computer-readable recording medium of claim 8, the program causing the computer to further perform:
- predicting transition in a situation of the entity;
- matching the situation information included in the stored situated information and the predicted situation; and
- presenting an information resource to which situation information fitting the predicted situation is added.

10. The computer-readable recording medium of claim 8, the program causing the computer to further perform:
- monitoring an information resource which is viewed by a entity utilizing the information resource; wherein
- the creating creates situated information by adding the detected situation information to the utilized information resource observed by the monitoring.

11. An information provision method executed by a computerized information provision device placed in an environment and accessible to at least one memory unit stored situated information through the internet, wherein the situated information is created by adding situation information to an information resource utilized at a situation, wherein the situation information is detected of which specifies at least one of an entity, a target of an action of the entity, a spatial situation where the entity is laid, a current temporal situation, an objection of the entity, a motivation of the entity, and a method for actualizing the action of the entity as a current situation of the entity, comprising:
- downloading the situated information which corresponds to a location of the information provision device from at least one of the physical memory unit; and
- presenting a service to a user utilizing the information provision device using the downloaded situated information.

12. A computer-readable recording medium wherein a program for a computer is recorded, wherein the computer is placed in an environment and accessible to at least one memory unit stored situated information through the internet, wherein the situated information is created by adding situation information to an information resource utilized at a situation, wherein the situation information is detected of which specifies at least one of an entity, a target of an action of the entity, a spatial situation where the entity is laid, a current temporal situation, an objection of the entity, a motivation of the entity, and a method for actualizing the action of the entity as a current situation of the entity, the program causing the computer to perform:
- downloading the situated information which corresponds to a location of the information provision device from at least one of the memory unit; and
- presenting a service to a user utilizing the information provision device using the downloaded situated information.

* * * * *